(12) United States Patent
Zhang et al.

(10) Patent No.: US 11,018,745 B2
(45) Date of Patent: May 25, 2021

(54) TECHNIQUES FOR CHANNEL STATE INFORMATION ACQUISITION IN NEW RADIO TECHNOLOGY

(71) Applicant: QUALCOMM INCORPORATED, San Diego, CA (US)

(72) Inventors: Yu Zhang, Beijing (CN); Chao Wei, Beijing (CN); Jilei Hou, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/324,710

(22) PCT Filed: Aug. 11, 2017

(86) PCT No.: PCT/CN2017/097023
§ 371 (c)(1),
(2) Date: Feb. 11, 2019

(87) PCT Pub. No.: WO2018/028659
PCT Pub. Date: Feb. 15, 2018

(65) Prior Publication Data
US 2019/0190581 A1    Jun. 20, 2019

(30) Foreign Application Priority Data

Aug. 12, 2016    (WO) ................. PCT/CN2016/095060

(51) Int. Cl.
*H04L 5/12*    (2006.01)
*H04B 7/06*    (2006.01)
(Continued)

(52) U.S. Cl.
CPC ............. *H04B 7/0626* (2013.01); *H04B 7/06* (2013.01); *H04B 7/0641* (2013.01);
(Continued)

(58) Field of Classification Search
CPC ...... H04B 7/0626; H04B 7/06; H04B 7/0641; H04B 7/0695; H04L 1/00; H04L 1/0026; H04L 1/06; H04L 1/0031
(Continued)

(56) References Cited

U.S. PATENT DOCUMENTS

2013/0070626 A1\* 3/2013 Gaal ..................... H04W 48/16
370/252
2015/0373674 A1\* 12/2015 Han ........................ H04L 5/001
370/329
(Continued)

FOREIGN PATENT DOCUMENTS

CN    101064556 A    10/2007
CN    105007126 A    10/2015
(Continued)

OTHER PUBLICATIONS

International Search Report and Written Opinion—PCT/CN2016/095060—ISA/EPO—dated May 5, 2017.
(Continued)

*Primary Examiner* — Helene E Tayong
(74) *Attorney, Agent, or Firm* — Patterson & Sheridan, L.L.P.

(57) ABSTRACT

Certain aspects of the present disclosure provide techniques for channel state information acquisition in wireless communication systems operating according to new radio (NR) technologies. An exemplary method that may be performed by a user equipment (UE) generally includes receiving a first beamformed channel state information reference signal (CSI-RS), determining, based on the first beamformed CSI-RS and the beacon reference signal, information regarding an adjustment, preferred by the UE, of a beam-former to be used for a forthcoming second beamformed CSI-RS, transmitting a beamformer adjustment indicator (BAI), periodically, semi-persistently, or aperiodically, that indicates the
(Continued)

preferred adjustment, and reporting channel state information feedback (CSF), based on the first beamformed CSI-RS.

16 Claims, 14 Drawing Sheets

(51) Int. Cl.
*H04L 1/00* (2006.01)
*H04L 1/06* (2006.01)
(52) U.S. Cl.
CPC .............. *H04B 7/0695* (2013.01); *H04L 1/00* (2013.01); *H04L 1/0026* (2013.01); *H04L 1/06* (2013.01); *H04L 1/0031* (2013.01)
(58) Field of Classification Search
USPC .......................................................... 375/262
See application file for complete search history.

(56) References Cited

U.S. PATENT DOCUMENTS

| | | | |
|---|---|---|---|
| 2016/0028519 A1 | 1/2016 | Wei | |
| 2016/0149679 A1 | 5/2016 | Frenne et al. | |
| 2017/0207843 A1* | 7/2017 | Jung | H04B 7/0408 |
| 2018/0180703 A1* | 6/2018 | Kim | H04W 64/00 |

FOREIGN PATENT DOCUMENTS

| | | |
|---|---|---|
| CN | 105356978 A | 2/2016 |
| CN | 105706376 A | 6/2016 |
| WO | 20120148162 A2 | 11/2012 |
| WO | 20150174437 A1 | 11/2015 |
| WO | WO-2016033978 A1 | 3/2016 |
| WO | WO-2016051792 A1 | 4/2016 |

OTHER PUBLICATIONS

International Search Report and Written Opinion for PCT/CN2017/097023, dated Nov. 9, 2017.

KYOCERA: "Dynamic Beam Selection CSI-RS Enhancement Scheme for EB/FD-MIMO", 3GPP Draft, R1-153112, 3GPP TSG RAN WG1 Meeting #81, 3rd Generation Partnership Project (3GPP), Mobile Competence Centre, 650, Route Des Lucioles, F-06921 Sophia-Antipolis Cedex France vol. RAN WG1, No. Fukuoka, Japan, May 25, 2015-May 29, 2015 May 24, 2015 (May 24, 2015), XP050970147, pp. 1-2, Retrieved from the Internet: URL:http://www.3gpp.org/ftp/Meetings_3GPP_SYNC/RAN1/Docs/ retrieved on May 24, 2015] pp. 1, 2, figure 1.

Supplementary Partial European Search Report—EP17838789—Search Authority—Munich—dated Feb. 10, 2020.

Qualcomm Inc: "Beamformed CSI-RS for support of FD-MIMO", 3GPP TSG-RAN WG1 #82, 3GPP Draft; R1-153880, 3rd Generation Partnership Project (3GPP), Mobile Competence Centre; 650, Route Des Lucioles; F-06921 Sophia-Antipolis Cedex; France, vol. RAN WG1, No. Beijing, China; Aug. 24, 2015-Aug. 28, 2015, Aug. 23, 2015 (Aug. 23, 2015), 4 Pages, XP051001316, Retrieved from the Internet: URL:http://www.3gpp.org/ftp/Meetings_3GPP_SYNC/RAN1/Docs/ [retrieved on Aug. 23, 2015], Section 2, pp. 1-3.

Supplementary European Search Report—EP17838789—Search Authority—Munich—dated May 20, 2020.

\* cited by examiner

TECHNIQUES FOR CHANNEL STATE INFORMATION ACQUISITION IN NEW RADIO TECHNOLOGY

This application claims priority to International Application No. PCT/CN2016/095060 filed Aug. 12, 2016, which is assigned to the assignee of the present application and is expressly incorporated by reference herein in its entirety.

INTRODUCTION

Aspects of the present disclosure related generally to wireless communications systems, and more particularly, to channel state information (CSI) acquisition in a wireless network using new radio (NR) technology.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

A wireless communication network may include a number of NodeBs that can support communication for a number of user equipments (UEs). A UE may communicate with a NodeB via the downlink and uplink. The downlink (or forward link) refers to the communication link from the NodeB to the UE, and the uplink (or reverse link) refers to the communication link from the UE to the NodeB.

These multiple access technologies have been adopted in various telecommunication standards to provide a common protocol that enables different wireless devices to communicate on a municipal, national, regional, and even global level. An example of an emerging telecommunication standard is new radio (NR, e.g., $5^{th}$ Generation (5G) radio access). NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as supporting beamforming, multiple-input multiple-output (MIMO) antenna technology, and carrier aggregation. However, as the demand for mobile broadband access continues to increase, there exists a need for further improvements in NR technology. Preferably, these improvements should be applicable to other multi-access technologies and the telecommunication standards that employ these technologies.

SUMMARY

The systems, methods, and devices of the present disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Techniques for channel state information acquisition in wireless communication networks using new radio (NR) technology are described herein. Channel state information feedback (CSF) based on dedicated pilots (e.g., beamformed channel state information reference signals) may be used in a massive multiple-input multiple-output (MIMO) wireless communications system to reduce CSI-RS overhead, CSI reporting overhead, and/or simplify codebook design, for example, beam selection by a user equipment (UE) as described herein may reduce an amount of information to be reported by the UE, enabling usage of a simpler codebook design.

In an aspect, a method for wireless communications is provided. The method may be performed, for example, by a UE. The method generally includes receiving a first beamformed channel state information reference signal (CST-RS) and a beacon reference signal, determining, based on the first beamformed channel state informal ion reference signal (CSI-RS) and the beacon reference signal, information regarding an adjustment, preferred by the UE, of a beamformer to be used for a forthcoming second beamformed CSI-RS, transmitting a beamformer adjustment indicator (BAI), periodically, semi-persistently, or aperiodically, that indicates the preferred adjustment, and reporting channel state information feedback (CSF), based on the first beamformed CSI-RS.

In an aspect, a method for wireless communications is provided. The method may be performed, for example, by a transmission and reception point (TRP). The method generally includes transmitting a first beam formed channel state information reference signal (CSI-RS) and a beacon reference signal, receiving a beamformer adjustment indicator (BAI) that indicates information regarding adjustment of a forthcoming second beamformed CSI-RS, receiving channel state information feedback (CSF), and transmitting the second beamformed CSI-RS, based on the information and the previously transmitted first beamformed CSI-RS.

In an aspect, an apparatus for wireless communications is provided. The apparatus generally includes means for receiving a first beamformed channel slate information reference signal (CSI-RS) and a beacon reference signal, means for determining, based on the first beamformed channel state information reference signal (CSI-RS) and the beacon reference signal, information regarding an adjustment, preferred by the apparatus, of a beamformer to be used for a forthcoming second beamformed CSI-RS, means for transmitting a beamformer adjustment indicator (BAI), periodically, semi-persistently, or aperiodically, that indicates the preferred adjustment, and means for reporting channel slate information feedback (CSF), based on the first beamformed CSI-RS.

In an aspect, an apparatus for wireless communications is provided. The apparatus generally includes means for transmitting a first beamformed channel stale information reference signal (CSI-RS) and a beacon reference signal, means for receiving a beamformer adjustment indicator (BAI) that indicates information regarding adjustment of a forthcoming second beamformed CSI-RS, means for receiving channel state information feedback (CSF), and means for transmitting the second beamformed CSI-RS, based on the information and the previously transmitted first beamformed CSI-RS.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
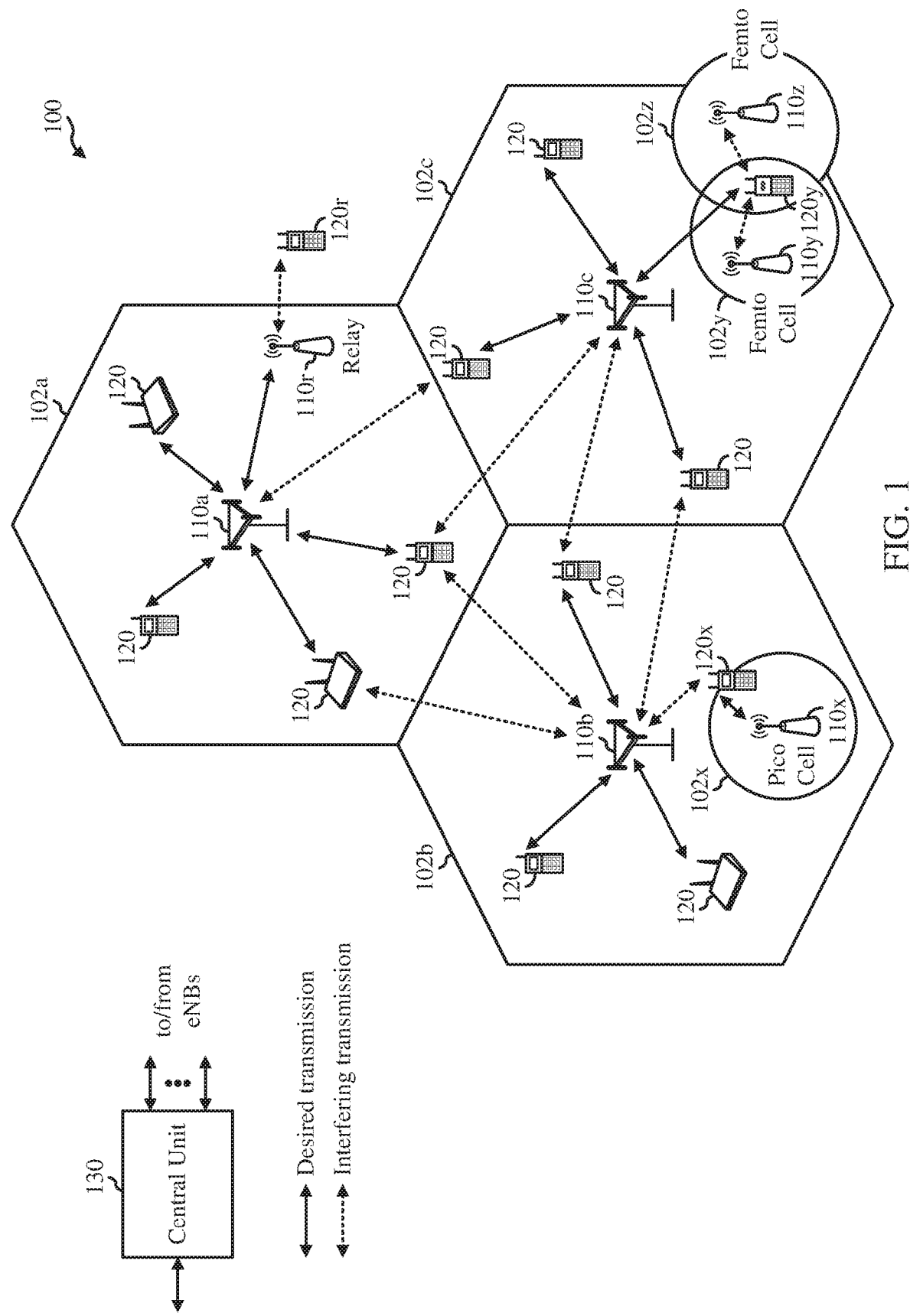
FIG. 1 is a block diagram conceptually illustrating an example telecommunications system, according to aspects of the present disclosure.

Aspects of the present disclosure provide apparatus, methods, processing systems, and computer program products for new radio (NR) (new radio access technology) cell measurement. New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may include Enhanced mobile broadband (eMBB) techniques targeting wide bandwidth (e.g., 80 MHz and larger) communications, millimeter wave (mmW) techniques targeting high carrier frequency (e.g., 60 GHz) communications, massive machine type communications (mMTC) techniques targeting non-backward compatible MTC techniques, and mission critical techniques targeting ultra reliable low latency communications (URLLC). For these general topics, different techniques are considered, including coding techniques, such as low-density parity check (LDPC) coding, and polar coding. An NR cell may refer to a cell operating according to the new air interface or fixed transport layer. An NR NodeB (e.g., a 5G NodeB or a next generation nodeB (gNB)) may correspond to one or multiple transmission and reception points (TRPs).

NR cells can be configured as access cell (ACells) or data only cells (DCells). For example, a radio access network (RAN) (e.g., a central unit or a distributed unit) can configure the cells as ACells or DCells. DCells may be cells used for carrier aggregation or dual connectivity, but not used for initial access, cell selection/reselection, or handover. In some cases, DCells may not transmit synchronization signals (SS)—in other cases DCells may transmit SS. A TRP of a DCell or an ACell may transmit downlink signals to UEs indicating the cell type of the cell that the TRP serves. Based on the cell type indication, a UE may communicate with the TRP. For example, a UE may determine TRPs to consider for cell selection, access, handover, and/or measurement based on cell types indicated by the TRPs.

In some cases, a UE can receive measurement configuration from the RAN. The measurement configuration information may indicate ACells or DCells for the UE to measure. The UE may monitor and/or detect measurement reference signals from the cells based on measurement configuration information. In some cases, the UE may blindly detect measurement reference signals (MRS). In some cases the UE may detect MRS based on MRS identifiers (MRS-IDs) indicated from the RAN. The UE may report the measurement results to the RAN via one or more TRPs.

Conventional CSI feedback (CSF) (i.e., CSI feedback of previously known wireless communication technologies, such as LTE) relies on common pilots (e.g., channel state information reference signals (CSI-RSs)) transmitted by the eNB for DL channel estimation and use of a precoding matrix indicator (PMI) codebook for transmit (TX) subspace quantization. Conventional CSF may encounter problems with massive multiple-input multiple-output (MIMO) communications, including increased pilot overhead, as the number of common pilots that should be transmitted is proportional to the number of TX antennas of a TRP. Another problem that conventional CSF may encounter with massive MIMO is an increase in feedback overhead, due to an exponential increase in codebook size resulting from the increased number of TX antennas.

According to aspects of the present disclosure, CSF based on dedicated pilots (e.g., beamformed CSI-RS) may be used in a massive MIMO wireless communications system to avoid the problems that conventional CSF may encounter with massive MIMO, as discussed above. CSF based on dedicated pilots may enable a CSI-RS overhead reduction and a simple codebook design, for example, beam selection by a UE as described herein may reduce an amount of information to be reported by the UE, enabling usage of a simpler codebook design.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting and the scope of the disclosure is being defined by the appended claims and equivalents thereof.

The techniques described herein may be used for various wireless communication networks such as LTE, CDMA, TDMA, TDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g., 5G radio access (RA)), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100 in which aspects of the present disclosure may be performed. For example, the wireless network may be a new radio or 5G network. UEs 120 may be configured to perform the operations 1200, discussed in more detail below with reference to FIG. 12, for receiving a beamformed reference signal and transmitting information regarding a preferred adjustment to a forthcoming beamformed reference signal. UEs 120 may additionally or alternatively be configured to perform the operations 1500, discussed in more detail below with reference to FIG. 15, for receiving multiple beamformed reference signals and transmitting information regarding a preferred adjustment for each of the beamformed reference signals. NodeB 110 may comprise a transmission and reception point (TRP) configured to perform the operations 1300, discussed in more detail below with reference to FIG. 13, for transmitting a beamformed reference signal to the UE 120, receiving feedback regarding the beamformed reference signal from the UE 120, and transmitting a second beamformed reference signal, based on the feedback, to the UE 120. Examples of NodeB 110 may include eNodeBs (eNBs) or next generation NodeBs (gNBs). The NR network may include a central unit 130. According to certain aspects, the UEs 120, NodeBs (TRPS) 110, and central unit 130 may be configured to perform operations related to measurement configuration, measurement reference signal transmission, monitoring, detection, measurement, and measurement reporting, which are described in greater detail below.

Each NodeB (TRP) 110 may provide communication coverage for a particular geographic area. In 3GPP (e.g., 4G, 5G, and NR) communications systems, the term "cell" can refer to a coverage area of a NodeB (e.g., a TRP) and/or a NodeB subsystem (e.g., a TRP) serving this coverage area, depending on the context in which the term is used.

A NodeB (e.g., a TRP) may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A NodeB for a macro cell may be referred to as a macro NodeB. A NodeB for a pico cell may be referred to as a pico NodeB. A NodeB for a femto cell may be referred to as a femto NodeB or a home NodeB. In the example shown in FIG. 1, the NodeBs 110a, 110b and 110c may be macro NodeBs for the macro cells 102a, 102b and 102c, respectively. The NodeB 110x may be a pico NodeB for a pico cell 102x. The NodeBs 110y and 110z may be femto NodeBs for the femto cells 102y and 102z, respectively. A NodeB may support one or multiple (e.g., three) cells.

The wireless network 100 may also include relay stations. A relay station is a station that receives a transmission of data and/or other information from an upstream station (e.g., a NodeB or a UE) and sends a transmission of the data and/or other information to a downstream station (e.g., a UE or a NodeB). A relay station may also be a UE that relays transmissions for other UEs. In the example shown in FIG. 1, a relay station 110r may communicate with the NodeB 110a and a UE 120r in order to facilitate communication between the NodeB 110a and the UE 120r. A relay station may also be referred to as a relay NodeB, a relay, etc.

The wireless network 100 may be a heterogeneous network that includes NodeBs of different types, e.g., macro NodeBs, pico NodeBs, femto NodeBs, relays, transmission reception points (TRPs), etc. These different types of NodeBs may have different transmit power levels, different coverage areas, and different impact on interference in the wireless network 100. For example, macro NodeBs may have a high transmit power level (e.g., 20 Watts) whereas pico NodeBs, femto NodeBs and relays may have a lower transmit power level (e.g., 1 Watt).

The wireless network 100 may support synchronous or asynchronous operation. For synchronous operation, the NodeBs may have similar frame timing, and transmissions from different NodeBs may be approximately aligned in time. For asynchronous operation, the NodeBs may have different frame timing, and transmissions from different NodeBs may not be aligned in time. The techniques described herein may be used for both synchronous and asynchronous operation.

A network controller 130 may couple to a set of NodeBs and provide coordination and control for these NodeBs. The network controller 130 may communicate with the NodeBs 110 via a backhaul. The NodeBs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a tablet, a netbook, a smart book, etc. A UE may be able to communicate with macro NodeBs, pico NodeBs, femto NodeBs, relays, etc. In FIG. 1, a solid line with double arrows indicates desired transmissions between a UE and a serving NodeB, which is a NodeB designated to serve the UE on the downlink and/or uplink. A dashed line with double arrows indicates interfering transmissions between a UE and a NodeB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR NR, may utilize OFDM with a CP on the uplink and downlink and include support for half-duplex operation using TDD. A single component carrier bandwidth of 100 MHz may be supported. NR resource blocks may span 12 sub-carriers with a sub-carrier bandwidth of 75 kHz over a 0.1 ms duration. Each radio frame may consist of 50 subframes and have a length of 10 ms. Consequently, each subframe may have a length of 0.2 ms. Each subframe may indicate a link direction (i.e., DL or UL) for data transmission and the link direction for each subframe may be dynamically switched. Each subframe may include data in the indicated link direction (i.e., DL or UL) as well as both DL and UL control data. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE, Multi-layer transmissions with up to 2 streams per UE may be supported. Aggregation of multiple cells may be supported with up to 8 serving cells. Alternatively, NR may support a different air interface, other than an OFDM-based air interface. NR networks may include entities such central units or distributed units.

Figure 2:
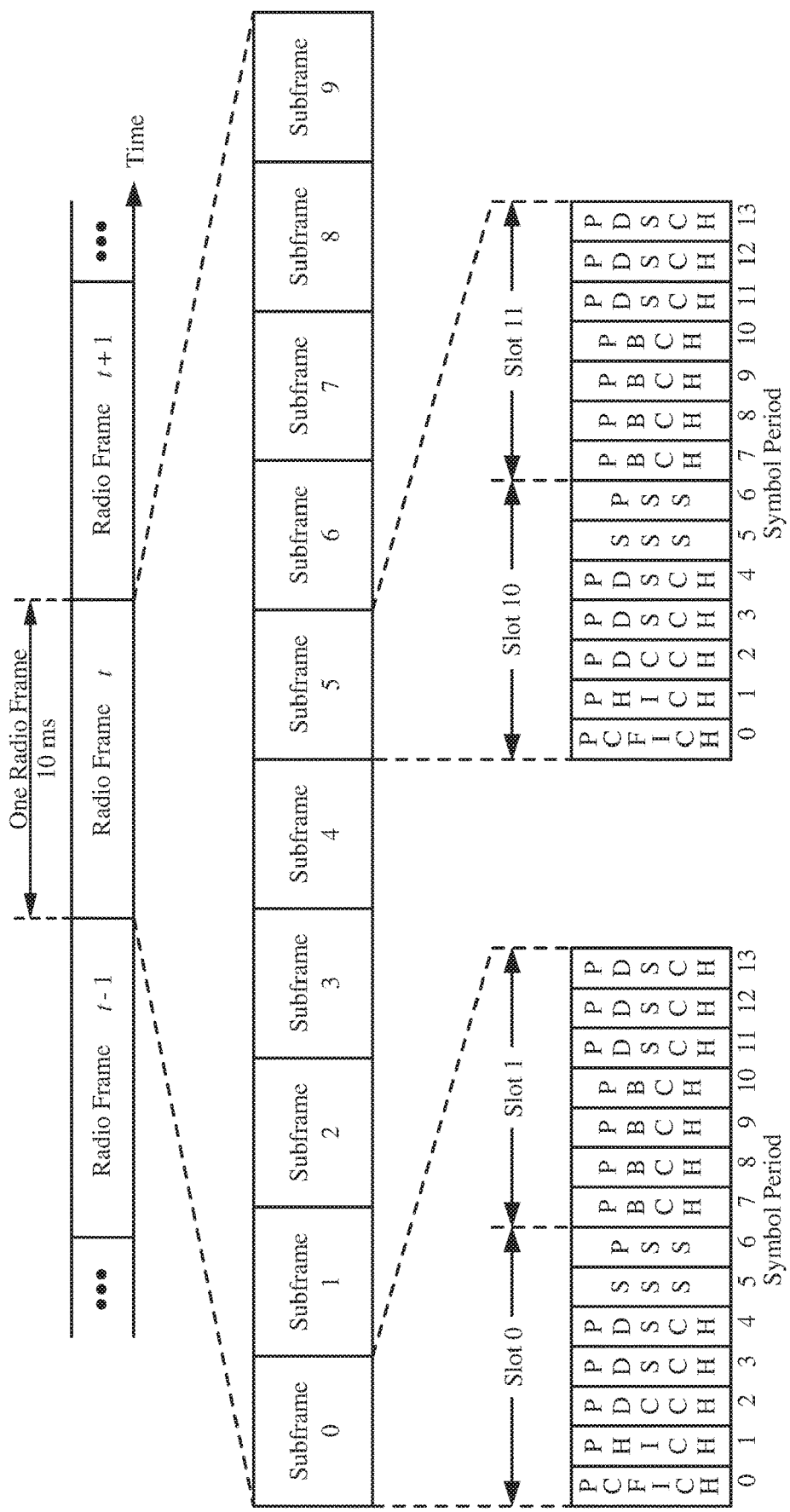
FIG. 2 is a block diagram conceptually illustrating an example downlink frame structure in a telecommunications system, according to aspects of the present disclosure.

FIG. 2 shows a down link (DL) frame structure used in a telecommunication systems (e.g., LTE). The transmission timeline for the downlink may be partitioned into units of radio frames. Each radio frame may have a predetermined duration 10 milliseconds (ms)) and may be partitioned into 10 sub-frames with indices of 0 through 9. Each sub-frame may include two slots. Each radio frame may thus include 20 slots with indices of 0 through 19. Each slot may include L symbol periods, e.g., 7 symbol periods for a normal cyclic prefix (as shown in FIG. 2) or 6 symbol periods for an extended cyclic prefix. The 2 L symbol periods in each sub-frame may be assigned indices of 0 through 2L−1. The available time frequency resources may be partitioned into resource blocks. Each resource block may cover N subcarriers (e.g., 12 subcarriers) in one slot.

In LTE, a NodeB may send a primary synchronization signal (PSS) and a secondary synchronization signal (SSS) for each cell in the NodeB. The primary and secondary synchronization signals may be sent in symbol periods 6 and 5, respectively, in each of sub-frames 0 and 5 of each radio frame with the normal cyclic prefix, as shown in FIG. 2. The synchronization signals may be used by UEs for cell detection and acquisition. The NodeB may send a Physical Broadcast Channel (PBCH) in symbol periods 0 to 3 in slot 1 of sub-frame 0. The PBCH may carry certain system information.

The NodeB may send a Physical Control Format Indicator Channel (PCFICH) in only a portion of the first symbol period of each sub-frame, although depicted in the entire first symbol period in FIG. 2. The PCHCH may convey the number of symbol periods (M) used for control channels, where M may be equal to 1, 2 or 3 and may change from sub-frame to sub-frame. M may also be equal to 4 for a small system bandwidth, e.g., with less than 10 resource blocks. In the example shown in FIG. 2, M=3. The NodeB may send a Physical HARQ Indicator Channel (PHICH) and a Physical Downlink Control Channel (PDCCH) in the first M symbol periods of each sub-frame (M=3 in FIG. 2). The PHICH may carry information to support hybrid automatic retransmission (HARQ). The PDCCH may carry information on uplink and downlink resource allocation for UEs and power control information for uplink channels. Although not shown in the first symbol period in FIG. 2, it is understood that the PDCCH and PHICH are also included in the first symbol period. Similarly, the PHICH and PDCCH are also both in the second and third symbol periods, although not shown that way in FIG. 2. The NodeB may send a Physical Downlink Shared Channel (PDSCH) in the remaining symbol periods of each sub-frame. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The NodeB may send the PSS, SSS and PBCH in the center 1.08 MHz of the system bandwidth used by the NodeB. The NodeB may send the PCFICH and PHICH across the entire system bandwidth in each symbol period in which these channels are sent. The NodeB may send the PDCCH to groups of UEs in certain portions of the system bandwidth. The NodeB may send the PDSCH to specific UEs in specific portions of the system bandwidth. The NodeB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first NI symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. A NodeB may send the PDCCH to the UE in any of the combinations that the UE will search.

A UE may be within the coverage of multiple NodeBs. One of these NodeBs may be selected to serve the UE. The serving NodeB may be selected based on various criteria such as received power, path loss, signal-to-noise ratio (SNR), etc.

Figure 3:
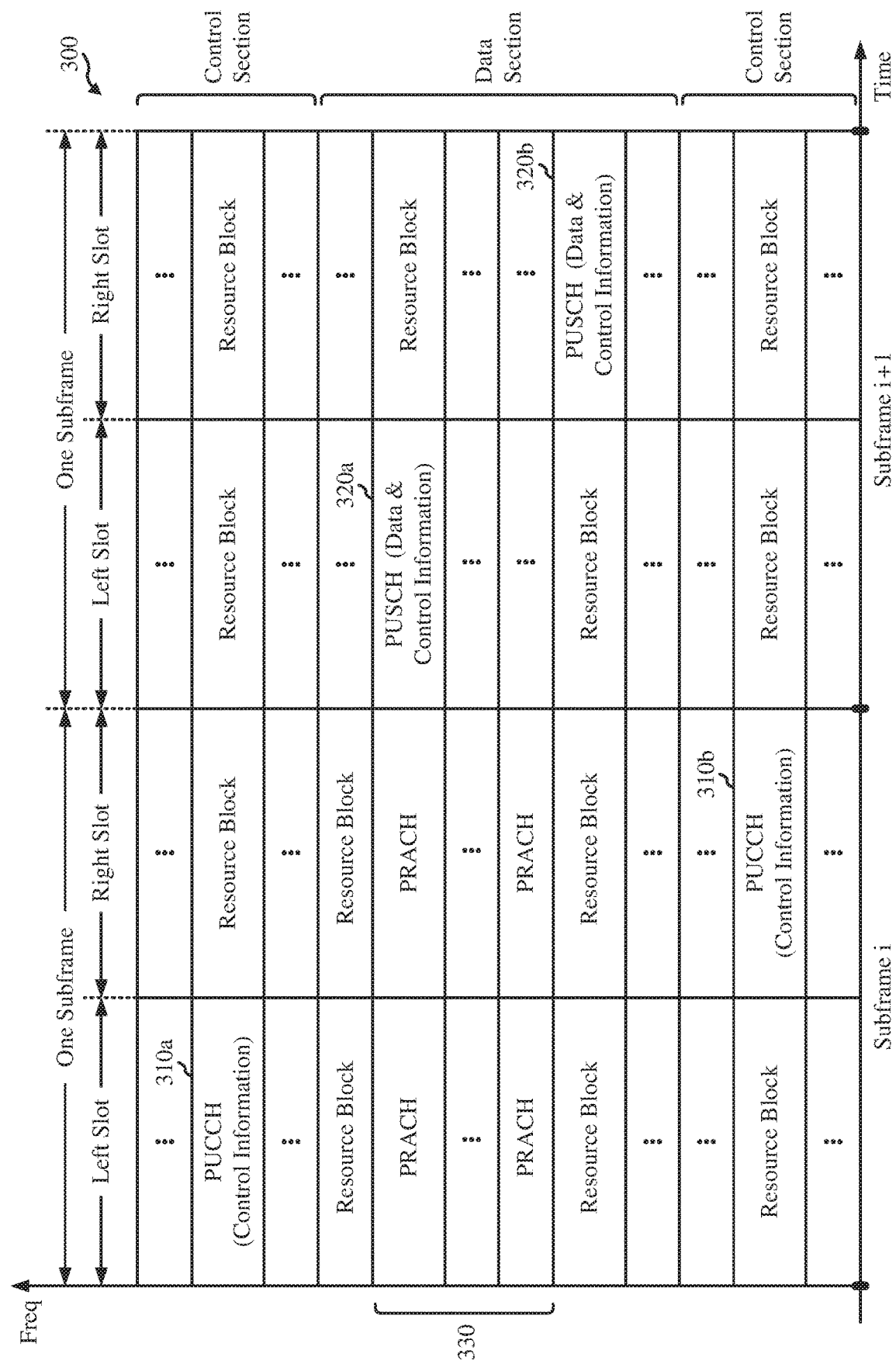
FIG. 3 is a diagram illustrating an example uplink frame structure in a telecommunications system, according to aspects of the present disclosure.

FIG. 3 is a diagram 300 illustrating an example of an uplink (UL) frame structure in a telecommunications system (e.g., LTE). The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 310*a*, 310*b* in the control section to transmit control information to a NodeB. The UE may also be assigned resource blocks 320*a*, 320*b* in the data section to transmit data to the NodeB. The UE may transmit control information in a physical UL control channel (PUCCH) on the assigned resource blocks in the control section. The may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 330. The PRACH 330 carries a random sequence and cannot carry any UL data/ signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 4:
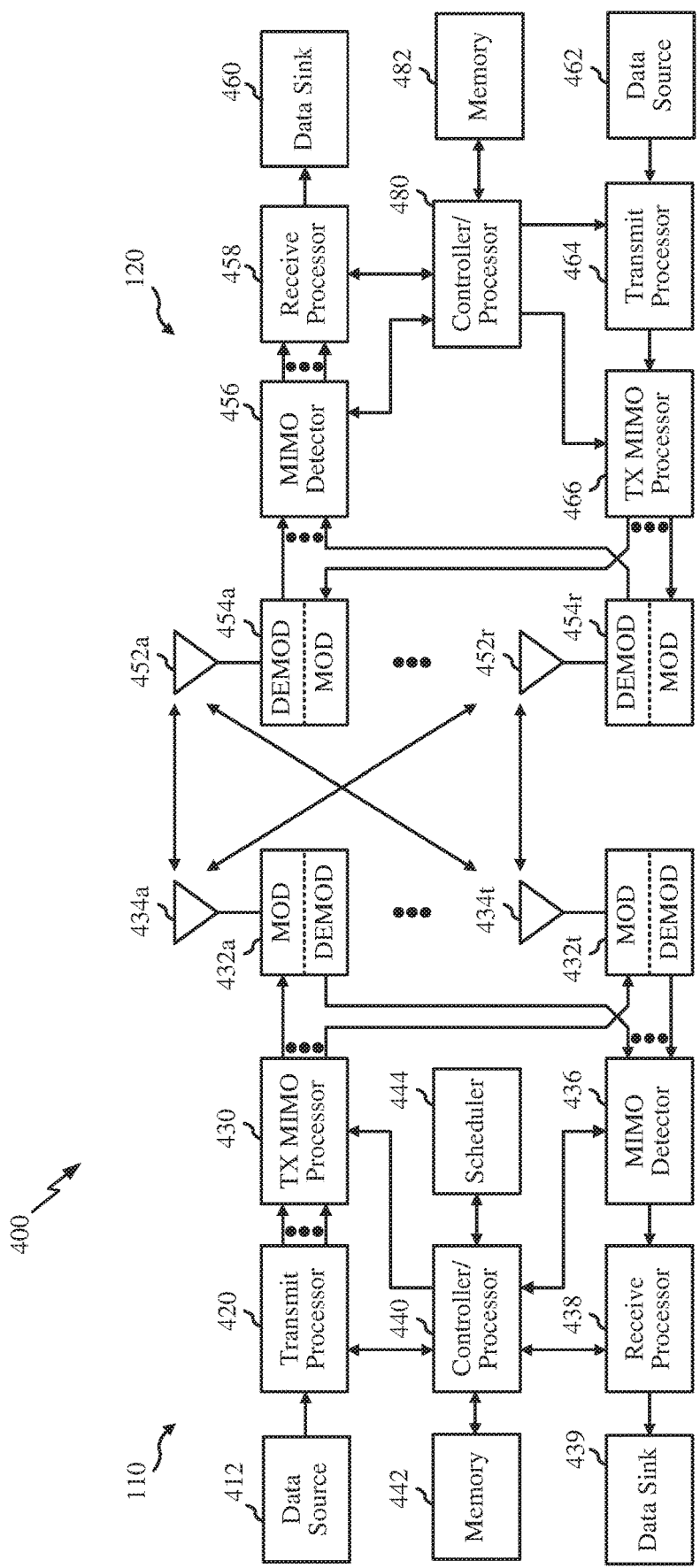
FIG. 4 is a block diagram conceptually illustrating a design of an example NodeB and user equipment (UE), according to aspects of the present disclosure.

FIG. 4 illustrates example components of the NodeB (e.g., TRP) 110 and UE 120 illustrated in FIG. 1, which may be used to implement aspects of the present disclosure. One or more components of the NodeB 110 and UE 120 may be used to practice aspects of the present disclosure. For example, antennas 452, Tx/Rx 222, processors 466, 458, 464, and/or controller/processor 480 of the UE 120 and/or antennas 434, processors 460, 420, 438, and/or controller/ processor 440 of the BS 110 may be used to perform the operations described herein and illustrated with reference to FIGS. 12-13 and 15.

For a restricted association scenario, the NodeB 110 may be the macro NodeB 110*c* in FIG. 1, and the UE 120 may be the UE 120*y*. The NodeB 110 may also be a base station of some other type. The NodeB 110 may be equipped with antennas 434*a* through 434*t*, and the UE 120 may be equipped with antennas 452*a* through 452*r*.

At the base station 110, a transmit processor 420 may receive data from a data source 412 and control information from a controller/processor 440. The control information may be for the PBCH, PCFICH, PHICH, PDCCH, etc. The data may be for the PDSCH, etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODS) 432*a* through 432*t*. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DE-MODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the PUSCH) from a data source 462 and control information (e.g., for the PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the base station 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the execution of various processes for the techniques described herein. The processor 480 and/or other processors and modules at the UE 120 may also perform or direct, e.g., the execution of the functional blocks illustrated in FIGS. 12-13 and 15, and/or other processes for the techniques described herein. The memories 442 and 482 may store data, and program codes for the base station 110 and the UE 120, respectively. A scheduler 444 may schedule UEs for data transmission on the downlink and/or uplink.

Figure 5:
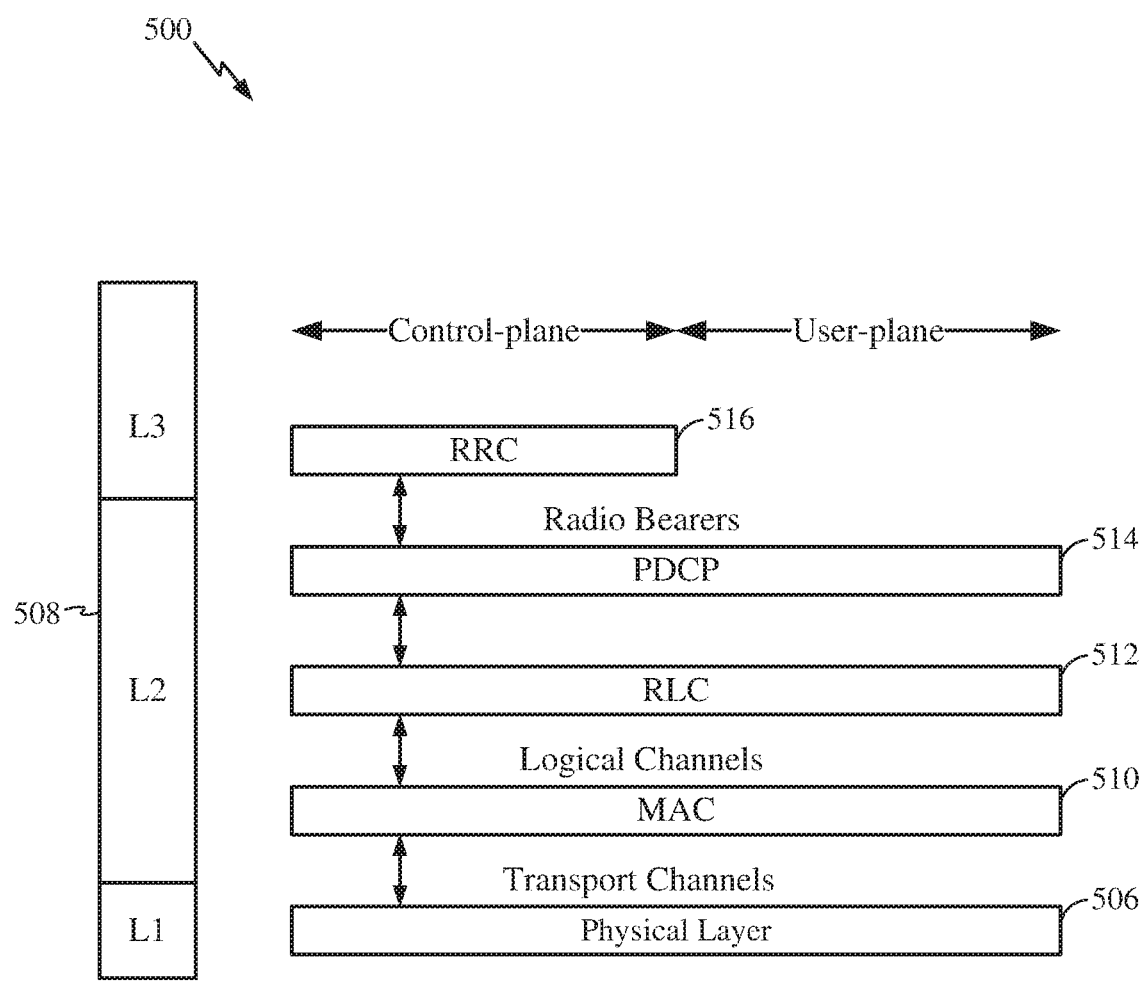
FIG. 5 is a diagram illustrating an example radio protocol architecture for the user and control planes, according to aspects of the present disclosure.

FIG. 5 is a diagram 500 illustrating an example of a radio protocol architecture for the user and control planes in LTE. The radio protocol architecture for the UE and the NodeB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and NodeB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the NodeB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multipleximg between different radio bearers and logical channels. The PDCP sublayer 514 also provides header compression for upper layer data packets to reduce radio transmission overhead, security by ciphering the data packets, and handover support for UEs between NodeBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and NodeB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the NodeB and the UE.

Figure 6:
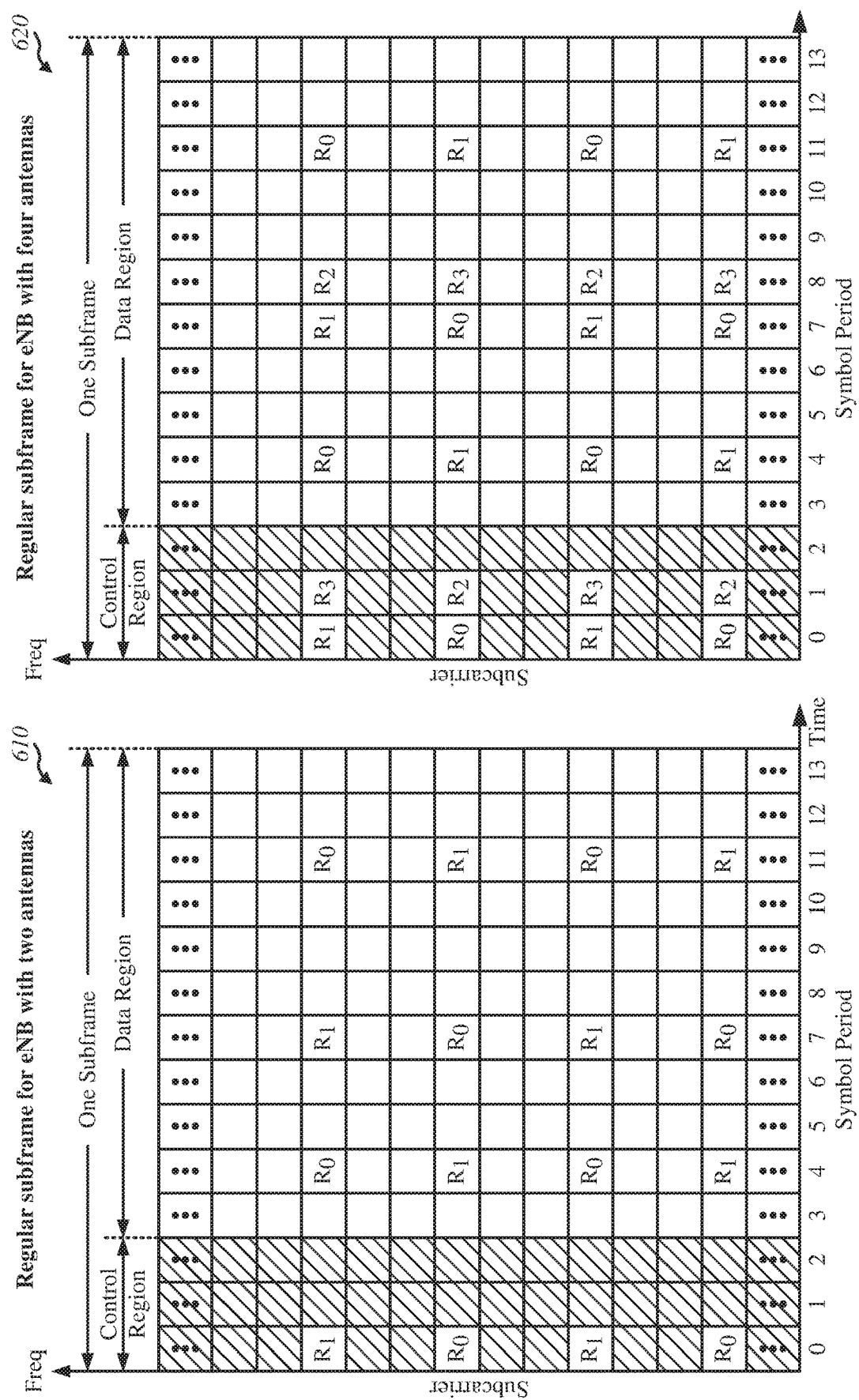
FIG. 6 illustrates an example subframe resource element mapping, according to aspects of the present disclosure.

FIG. 6 shows two exemplary sub-frame formats 610 and 620 for the downlink with the normal cyclic prefix. The available time frequency resources for the downlink may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 610 may be used for a NodeB equipped with two antennas. A CRS may be transmitted from antennas 0 and 1 in symbol periods 0, 4, 7 and 11. A reference signal is a signal that is known a priori by a transmitter and a receiver and may also be referred to as a pilot. A CRS is a reference signal that is specific for a cell, e.g., generated based on a cell identity (ID). In FIG. 6, for a given resource element with label $R_a$, a modulation symbol may be transmitted on that resource element from antenna a, and no modulation symbols may be transmitted on that resource element from other antennas. Subframe format 620 may be used for a NodeB equipped with four antennas. A CRS may be transmitted from antennas 0 and 1 in symbol periods 0, 4, 7 and 11 and from antennas 2 and 3 in symbol periods 1 and 8. For both subframe formats 610 and 620, a CRS may be transmitted on evenly spaced subcarriers, which may be determined based on cell ID. Different NodeBs may transmit their CRSS on the same or different subcarriers, depending on their cell IDs. For both subframe formats 610 and 620, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used each of the downlink and uplink for FDI) in LTE. For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+1Q, etc., where q ∈ {0, . . . , Q−1}.

The wireless network may support hybrid automatic retransmission (HARQ) for data transmission on the downlink and uplink. For HARQ, a transmitter (e.g., a NodeB) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage area of multiple NodeBs. One of these NodeBs may be selected to serve the UE. The serving NodeB may be selected based on various criteria such as received signal strength, received signal quality, pathloss, etc. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering NodeBs.

Example New Radio Cell Measurement

New radio (NR) may refer to radios configured to operate according to a wireless standard, such as 5G (e.g., wireless network 100). NR may include enhanced mobile broadband (eMBB) techniques targeting wide bandwidth (e.g., 80 MHz and larger) communications, millimeter wave (IW) techniques targeting high carrier frequency (e.g., 60 GHz) communications, massive machine type communications (mMTC) techniques targeting communications with non-backward compatible machine type communications (MTC) devices, and mission critical techniques targeting ultra reliable low latency communications (URLLC).

An NR cell may refer to a cell operating in an NR network. An NR NodeB (e.g., NodeB 110) may correspond to one or multiple transmission and reception points (TRPs). As used herein, a cell may refer to a combination of downlink (and potentially also uplink) resources. The linking between the carrier frequency of the downlink resources and the carrier frequency of the uplink resources is indicated in the system information (SI) transmitted on the downlink resources. For example, system information can be transmitted in a physical broadcast channel (PBCH) carrying a master information block (MIB).

NR RAN architecture may include a central unit (CU) (e.g., central unit 140). The CU may be an access node controller (ANC). The CU terminates a backhaul interface to a RAN core network (RAN-CN) and terminates backhaul interfaces to neighboring RAN nodes. The RAN may include a distributed unit (DU) that may be one or more TRPs that may be connected to one or more ANCs (not shown). TRPs may advertise system information. (e.g., a Global TRP identifier (TRP ID)), may include PDCP, RLC, and/or MAC functions, may comprise one or more antenna ports, and may be configured to individually (dynamic selection) or jointly (joint transmission) transmit reference signals, and may serve traffic to a UE.

Example Channel State Information Acquisition in New Radio

MIMO is seen as a key technology enabler for satisfying new radio (NR) coverage and capacity requirements that ITU and 3GPP have begun developing, such as those in Recommendation ITU-R M.2083 "Framework and overall objectives of the future development of IMT for 2020 and beyond." The advantages of using MIMO may come at the price of accurate channel state information (CSI) being available at a transmission/reception point (TRP). In TDD systems, the CSI may be available at the TRP by exploiting UL-DL channel reciprocity. In FDD systems, CSI may be obtained at a TRP via UE feedback based on DL channel estimation aided by DL reference signals (RS).

Although newly allocated spectrum for NR is more likely to be in TDD bands than in FDD bands, non-/semi-reciprocal transmission may also be carefully designed to enable efficient use of MD spectrum. The NR standards should consider a broad range of frequency bands including some FDD bands. The spectrum of some existing RATs may be refarmed for NR deployment in the future. Some of those are paired spectrum in low frequencies, suitable for coverage layer of NR.

Even for a TDD spectrum, a reciprocity based approach may not always be available and/or reliable. The impairment factors include residue error of UL-DL calibration, quality of sounding, and asymmetry of TX and RX antennas at the UE. Some of these issues may be tractable. For example, the sounding quality due to channel aging may be addressed by introducing a self-contained subframe structure with fast sounding. But some impairment factors are due to hardware restrictions.

Conventional CSI feedback (CSF) (i.e., CSI feedback of previously known wireless communication technologies, such as LTE) relies on common pilots (e.g., CSI-RS) transmitted by the eNB for DL channel estimation and use of a PMI codebook for TX subspace quantization. Conventional CSF may encounter problems with massive MIMO, including increased pilot overhead, as the number of common pilots that should be transmitted is proportional to the number of TX antennas of a TRP. Another problem that conventional CST may encounter with massive MIMO is an increase in feedback overhead, due to an exponential increase in codebook size resulting from the increased number of TX antennas.

According to aspects of the present disclosure, CSF based on dedicated pilots, a.k.a. beamformed CSI-RS, may be used in a massive MIMO wireless communications system to avoid the problems that conventional CSF may encounter with massive MIMO, as discussed above. CSF based on dedicated pilots may enable a CSI-RS overhead reduction and a simple codebook design (e.g., beam selection by a UE may reduce an amount of information to be reported, allowing for a simpler codebook design).

Figure 7:
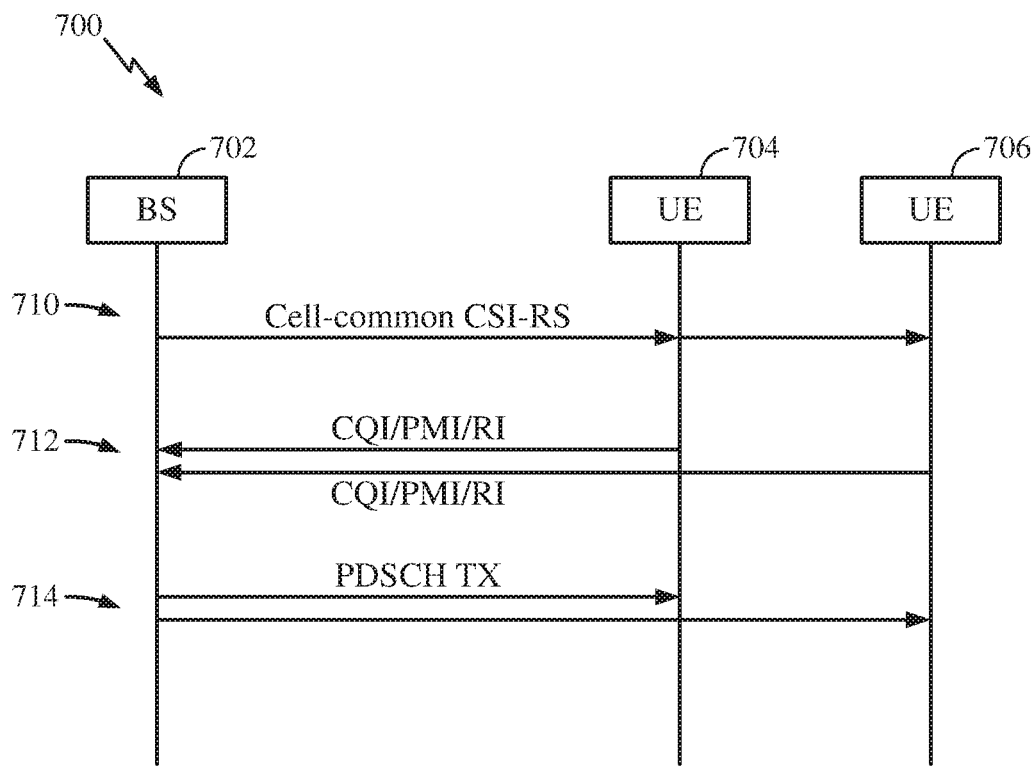
FIG. 7 illustrates an example communications system, in accordance with aspects of the present disclosure.

FIG. 7 illustrates an example communications system 700 performing operations to report and receive conventional CSF, according to aspects of the present disclosure. The exemplary communications system 700 includes a BS 702 (e.g., an eNB or a gNB) and two UEs 704 and 706. At 710, the BS transmits a cell-common CSI-RS that is detected by the two UEs. At 712, each UE reports conventional CSF, for example a CQI, PMI, and RI, based on the cell-common CSI-RS, thereby providing the BS with information regarding the channel conditions at the UE. At 714, the BS transmits a PDSCH to each of the UEs, using the CQI, PMI, and RI reported by the corresponding UE to determine the transmission parameters of the PDSCH, such as transmission power, coding rate, and beams to use.

Figure 8:
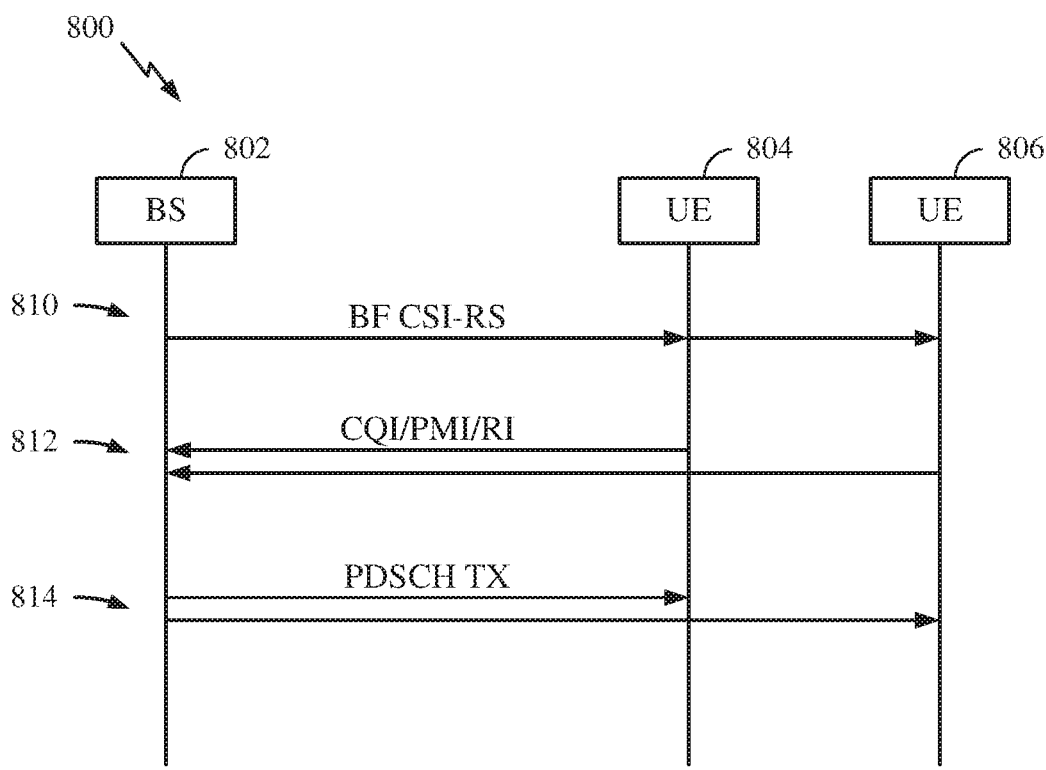
FIG. 8 illustrates an example communications system, in accordance with aspects of the present disclosure.

FIG. 8 illustrates an example communications system 800 performing operations to report and receive CSF based on beamformed CSI-RS (BF CSI-RS), according to aspects of the present disclosure. The exemplary communications system 800 includes an BS 802 (e.g., an eNB or a gNB) and two UEs 804 and 806. At 810, the BS transmits a beamformed CSI-RS to each of the two UEs, which each detect their beamformed CSI-RS. At 812, each UE reports a CSF, for example a CQI, PMI, and RI, based on the corresponding beamformed CSI-RS that that UE detected, thereby providing the BS with information regarding the channel conditions at the UE. The BS transmits a different beamformed CSI-RS for each UE. At 814, the BS transmits PDSCHs to each of the UEs, using the CQI, PMI, RI, and information of the beamformed CSI-RS of the corresponding UE to determine transmission parameters of the PDSCH, such as transmission power, coding rate, and beams to use. With massive MIMO, the pilot overhead is proportional to the number of transmit antennas. Also, the more antennas there are, the larger the codebook needed to provide a solution. Using a dedicated pilot in addition to beamformed CSI-RS can reduce overhead as compared with using a beamformed CSI-RS without a dedicated pilot.

A BS (e.g., an eNB or a gNB) determines beamforming parameters (e.g., a beam) to use in transmitting beamformed CSI-RS to enable CSF based on beamformed CSI-RS. One option for a BS to determine beamforming parameters is for the BS to exploit the weak UL-LA, reciprocity in an FDD wireless communications system. While this technique has an advantage in that the CSI-RS beamformer is determined solely by the BS, accuracy of the selection of the beamformer suffers due to the weak reciprocity of the UL and DL.

Another option for a BS (e.g., an eNB or a gNB) to determine beamforming parameters is for the BS to rely on UE feedback of the (slowly varying) TX subspace. One technique for obtaining UE feedback is for the UE to generate the feedback based on non-precoded (NP) CSI-RS. Two CSI-RS are used, NP CSI-RS and beamformed. CSI-RS. Combining NP CSI-RS with beamformed CSI-RS may be referred to as a hybrid CSI-RS scheme or technique. In this technique, a UE may estimate wideband TX covariance based on long-term and/or sparse NP CSI-RS and feedback quantized TX covariance or the basis of TX covariance in a long-term and/or incremental manner.

Figure 9:
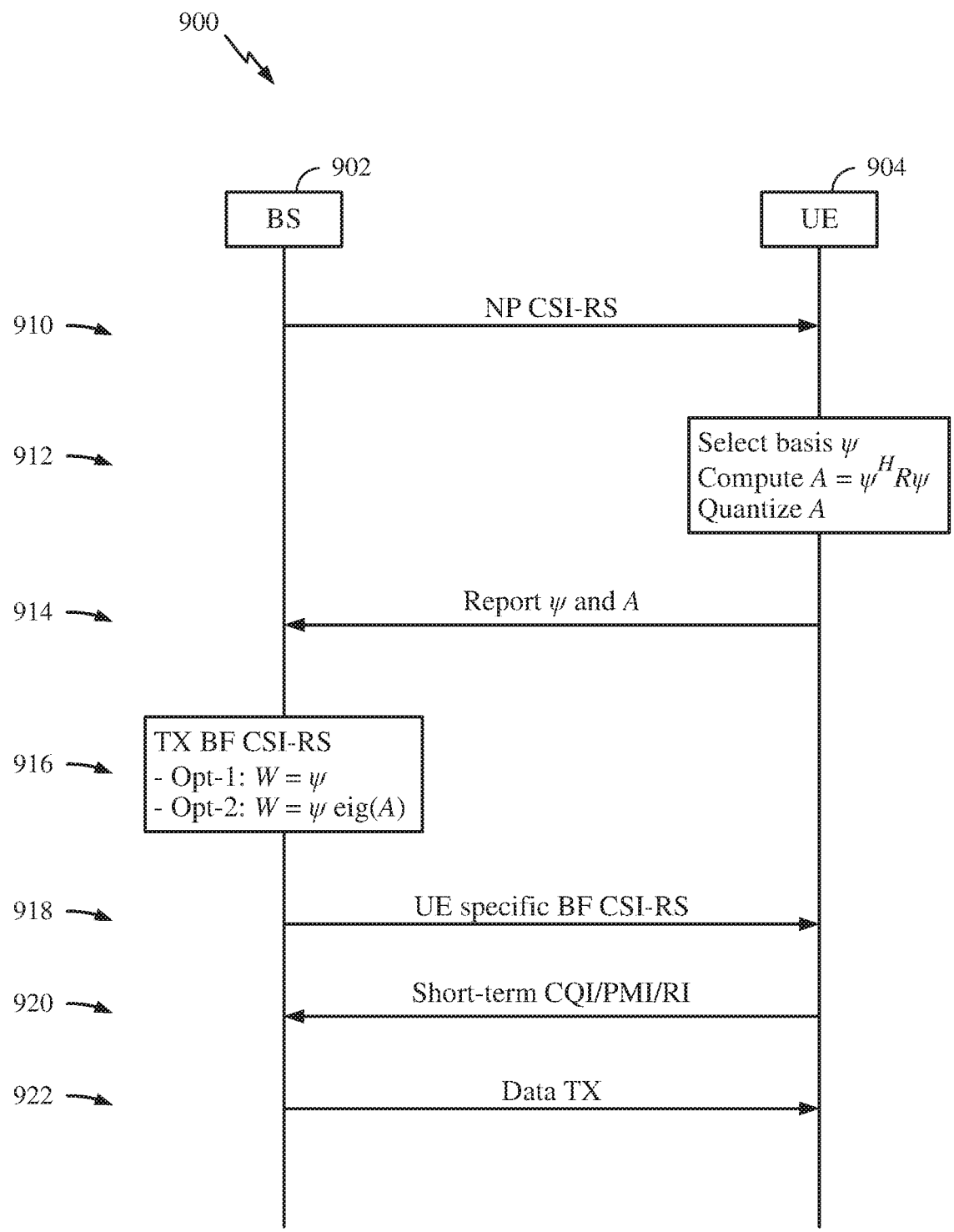
FIG. 9 illustrates an example communications system, in accordance with aspects of the present disclosure.

FIG. 9 illustrates an example communications system 900 performing operations to report and receive CSF based on beamformed CSI-RS where a BS (e.g., an eNB or a gNB) generates the BF CSI-RS based on UE feedback based on NP CSI-RS as mentioned above, according to aspects of the present disclosure. The exemplary communications system 900 includes a BS 902 and a UE 904. At 910, the BS transmits a NP CSI-RS to the UE, which detects the NP CSI-RS. At 912, the UE may select a $N_t \times N$ basis matrix $\Psi = (\Psi_1, \ldots \Psi_N)$, calculate a $N_t \times N_t$ TX covariance matrix $\hat{R}$, compute the reduced dimension representation of $\hat{R}$, $A = \Psi^H \hat{R} \Psi$ for $N \ll N_t$, and quantize A. At 914, the UE reports $\Psi$ and the quantized representation of A. At 916, the BS may determine beamforming parameters to use in transmitting a BF CSI-RS to the UE. The BS may determine the beamforming parameters based on $\Psi$, or, if the span($\Psi_1, \ldots, \Psi_N$) covers the signal subspace of interest, then the BS may approximate eig{$\hat{R}$} by calculating eig{$\hat{R}$}=$\Psi$eig{A}. At 918, the BS transmits a BE CSI-RS using the determined beamforming parameters. The UE detects the BF CSI-RS and, at 920, reports CSF, for example a CQI, PMI, and RI, based on the beamformed CSI-RS that that UE detected. At 922, the BS transmits a data transmission to the UE, using the CQI, PMI, RI, and information of the beamformed CSI-RS to determine transmission parameters of the data transmission, such as transmission power, coding rate, and beams to use.

The technique illustrated in FIG. 9 and described above may require significant transmission overhead because of the necessity of transmitting NP CSI-RS and BF CSI-RS and because of the necessity of transmitting a quantization of A. In addition, the technique may require significant processing capability for measuring A.

Another technique for obtaining UE feedback of the TX subspace is for the UE to generate the feedback based on multiple beamformed (BF) CSI-RSs. In this technique, a UE may measure channel quality (e.g., RSRP, spectrum efficiency) on each BF CSI-RS. The UE may also feedback the preference of CSI-RS beamformer using a CSI-RS resource indicator (CRI) to indicate which BF CSI-RS resource is preferred. Also, the UE reports conventional CSF, for example PMI/RI/CQI associated with the CSI-RS resource indicated by reported CRI. The BS (e.g., an eNB or a gNB)transmits a PDSCH to each of the UEs, using conventional CSF, i.e., CQI, PMI, and RI, reported by the corresponding UE.

Figure 10:
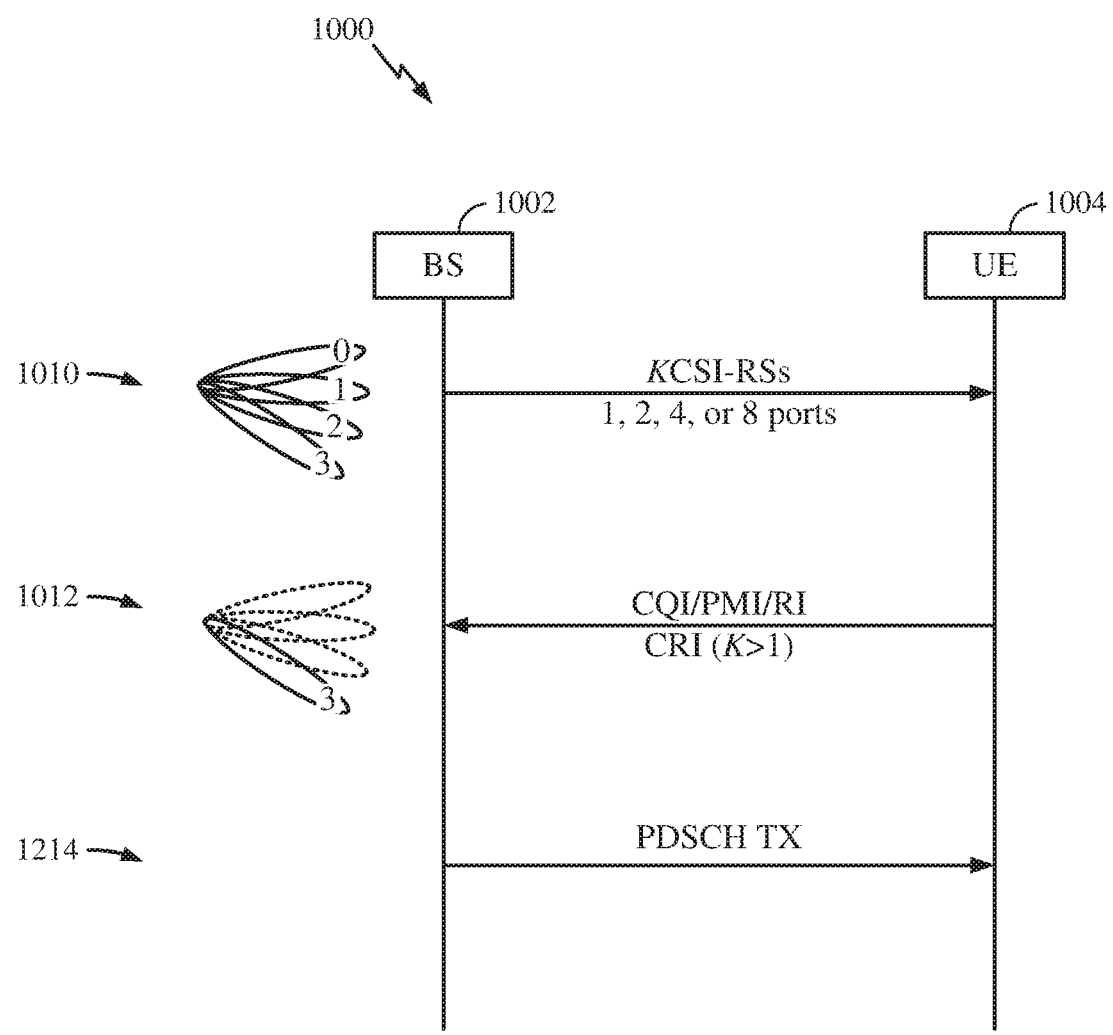
FIG. 10 illustrates an example communications system, in accordance with aspects of the present disclosure.

FIG. 10 illustrates an example communications system 1000 performing operations to report and receive CSF based on multiple BF CSI-RSs as mentioned above, according to aspects of the present disclosure. The exemplary communications system 1000 includes a BS (e.g., an eNB or a gNB) 1002 and a UE 1004. In the exemplary communications system, the UE is configured (e.g., via RRC signaling and/or according to a communications standard) with four BE CSI-RS resources, although the UE may be configured with two or more (e.g., K≥2) BF CSI resources to perform the described technique. At 1010, the BS transmits four BE CSI-RSs. A CSI-RS resource may be associated with 1, 2, 4, or 8 antenna ports per CSI-RS resource. At 1012, the UE reports a CRI indicating the CSI resource that the UE prefers (shown as BF CSI-RS resource #3 in FIG. 10) and CSF, such as a CQI, PMI, and RI conditioned on the reported CRI.

One issue that may come up is the resolution of a CSI-RS beamformer in the technique illustrated in FIG. 10 depends on a number of configured CSI-RS resources seen by the UE. Because of this dependency, improving BF resolution uses more CSI-RS resources, possibly increasing transmission resource overhead, because the amount of overhead may be proportional to the number of resources used. In addition, CSI-RS beamformer adjustment is not feasible, due to the various CSI-RSs being shared among multiple UEs served by the BS (e.g., an eNB or a gNB).

According to aspects of the present disclosure, techniques for a UE to assist in subspace tracking are provided. In aspects of the present disclosure, a UE may provide incremental feedback based on beamformed CST-RS and beacon RS transmitted by one or more BSs (e.g., eNBs and/or gNBs).

Figure 11:
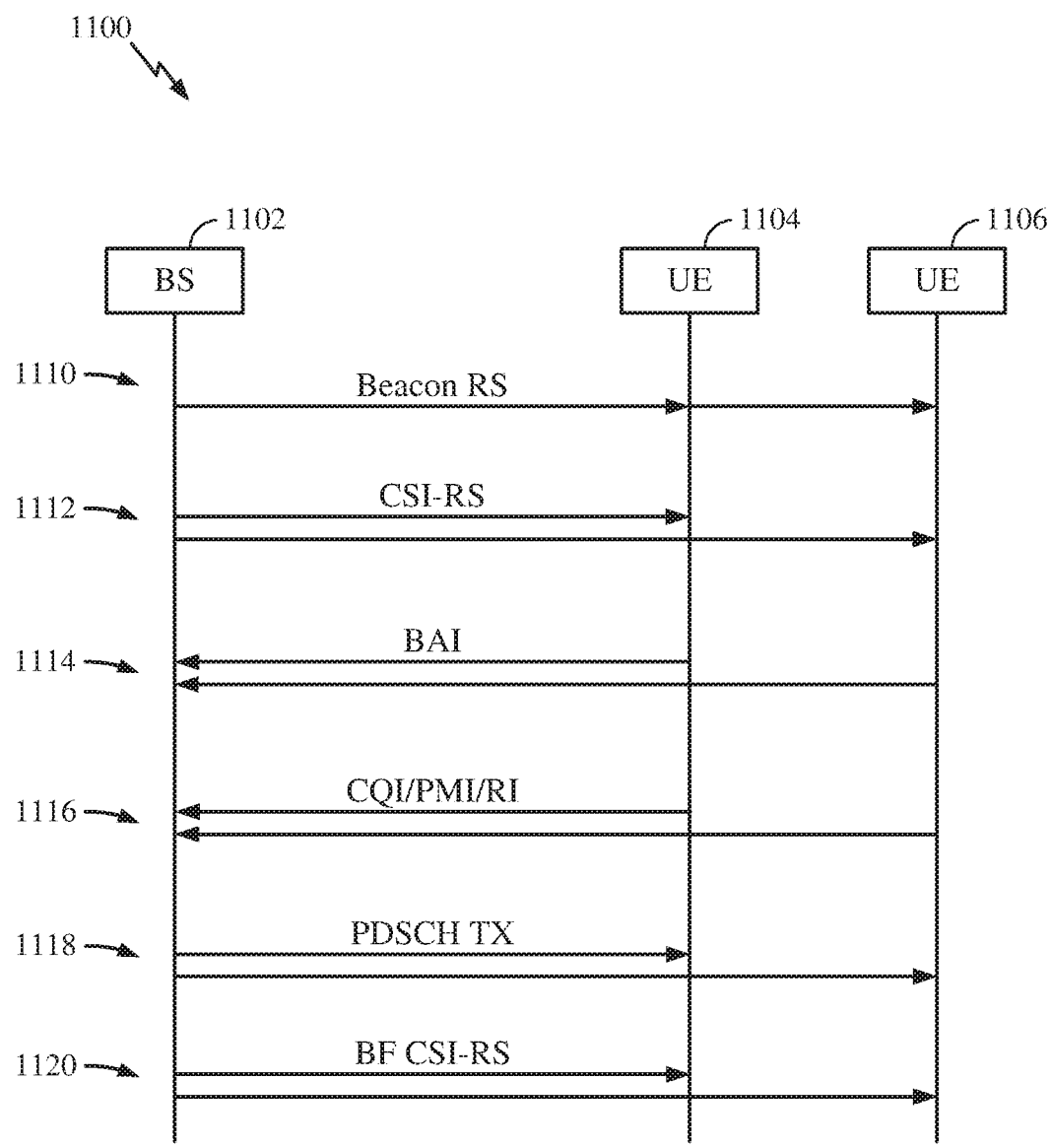
FIG. 11 illustrates an example communications system in which aspects of the present disclosure may be practiced.

FIG. 11 illustrates an exemplary communications system 1100 in which aspects of the present disclosure may be practiced. According to aspects of the present disclosure and with reference to FIG. 11, UEs 1104, 1106 may receive from a BS (e.g., an eNB or a gNB) 1102 two sets of RS, $K_{CSI} \geq 1$ BF CSI-RSs and $K_{beacon} \geq 1$ beacon RSs. At 1110, the BS 1102 transmits a beacon RS that is one of the $K_{beacon}$ RSs that the UEs are configured to detect, and the UEs detect the beacon RS. At 1112, the BS transmits one or more BF CSI-RSs (two are shown in FIG. 11), wherein each BF-CSI-RS is one of the $K_{CSI}$ BF CSI-RSs that the UEs are configured to detect. Each UE detects a BF CSI-RS. Each UE determines how that UE would prefer a beamformer of the BF CSI-RS (detected by that UE) to be adjusted. At 1114, each UE transmits a beamformer adjustment indicator (BAI) to the BS indicating how that UE would prefer the beamformer to be adjusted. Each BAI is associated with a CSI-RS (e.g., the BF CSI-RS detected by the UE transmitting that BAI) and indicates a beacon RS that can be employed as a reference for the adjustment of the beamformer for the associated BF CST-RS. At 1116, each UE reports CSF to the BS that may include CQI, PMI, and RI and is based on the BF CSI-RS that the UE detected. On the reception of a BAI from a UE, the BS may adjust the beamformer(s) for forthcoming transmission of BF CSI-RS(s), which may help a UE measure an accurate CSI on an upcoming frame. At 1118, the BS transmits a data transmission, such as a PDSCH, to each of the UEs, with transmission parameters based on the reported CSF from the corresponding UE and the corresponding BE CSI-RS. The BS also adjusts the beamformer for the CSI-RS. The BS may transmit an adjusted CSI-RS at 1120, with the adjustment determined based on the BAI received at 1114. In one example there may be 64 beams. In the example, the UE reports which one should be considered for downlink transmission. Still in the example, 4 of the 64 beams are used. One improvement using the present method and apparatus is that a UE may use both a BF CSI-RS and a common beacon RS, where the common beacon RS is used for refining the beamformer and the BF CSI-RS may be used for CSF reporting.

Figure 12:
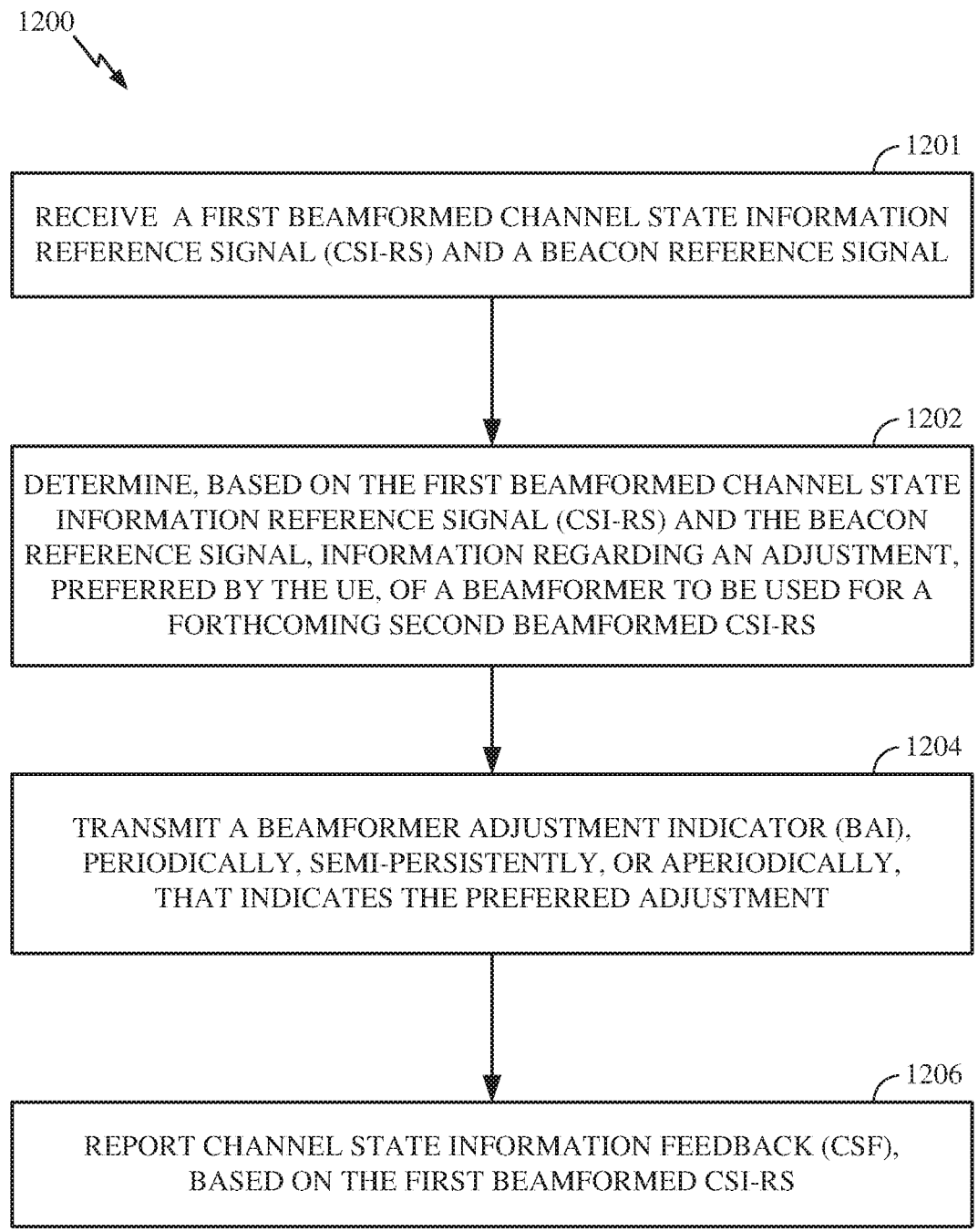
FIG. 12 illustrates exemplary operations for wireless communications, in accordance with aspects of the present disclosure.

FIG. 12 illustrates exemplary operations 1200 for wireless communications, in accordance with aspects of the present disclosure. Operations 1200 may be performed by a UE, such as UE 120 shown in FIG. 1, for example.

Operations 1200 begin at 1201 with the UE receiving a first beamformed channel state information reference signal (CSI-RS) and a beacon reference signal. The UE 904 receiving the NP CSI-RS at 910 and the UE-specific BF CSI-RS at 918 in FIG. 9 is an example of a UE receiving a first beamformed CSI-RS and a beacon reference signal. Similarly, the UEs 1104 and 1106 receiving the beacon RS at 1110 and the BF CSI-RS at 1112 in FIG. 11 are examples of a UE receiving a first beamformed CSI-RS and a beacon reference signal.

At 1202, the UE determines, based on the first beamformed channel state information reference signal (CSI-RS) and the beacon reference signal, information regarding an adjustment, preferred by the UE, of a beamformer to be used for a forthcoming second beamformed CSI-RS. For example, a UE may estimate the BF CSI-RS channel, $H_T$ and the kth beacon RS channel, $H_B^{(k)}$, compute a matrix $R_B^{(k)}$, and then evaluate $\mu_k$, the benefit of adjusting T towards the kth beacon, as described in more detail, below.

At 1204, the UE transmits a beamformer adjustment indicator (BAI), periodically, semi-persistently, or aperiodically, that indicates the preferred adjustment. In one example, two beamformer adjustment indicators may be used to indicate adjustments of a CSI-RS beamformer, where one of the beamformer adjustment indicators indicates the BF CSI-RS moves in a positive direction, and the other beamformer adjustment indicator indicates the BF CSI-RS moves in a negative direction. In the example, the UE determines which one of the two BAIs to transmit, based on the determination performed in step 1202. The UEs 1104 and 1106 transmitting the BAIs at 1116 in FIG. 11 are an example of the UE transmitting a RAI periodically, semi-persistently, or aperiodically.

Operations 1200 conclude at 1206 with the UE reporting channel state information feedback (CSF), based on the first beamformed CSI-RS. For example, the UEs 1104 and 1106 may report one or more of a CQI, PMI, and RI based on the first beamformed CSI-RS (received at 1112), as shown at 1116 in FIG. 11.

Figure 13:
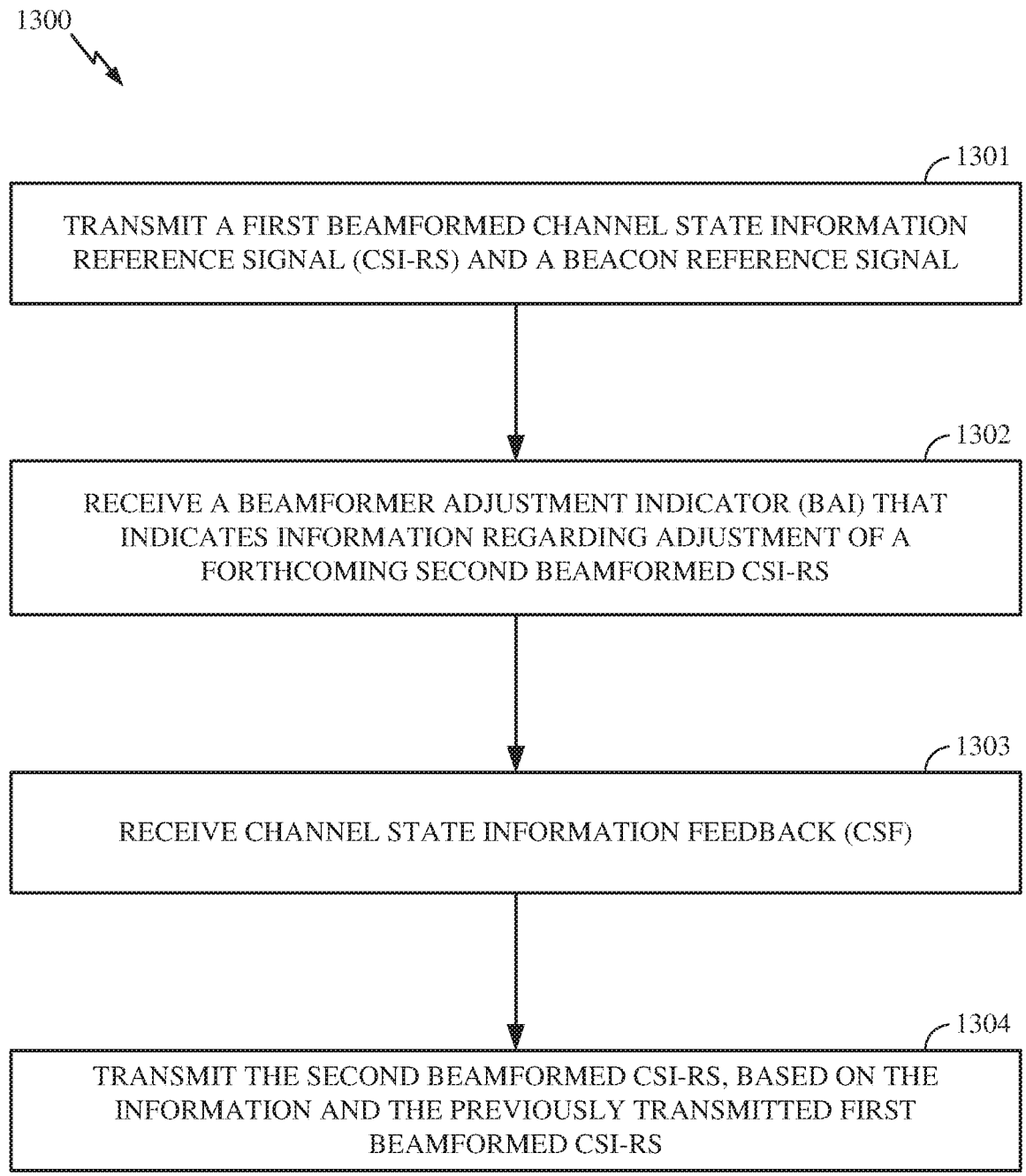
FIG. 13 illustrates exemplary operations for wireless communications, in accordance with aspects of the present disclosure.

FIG. 13 illustrates exemplary operations 1300 for wireless communications, in accordance with aspects of the present disclosure. Operations 1300 may be performed by a base station (BS), such as NodeB 110a shown in FIG. 1, an eNB, or a gNB, for example.

Operations 1300 begin at 1301 where the BS transmits a first beamformed channel state information reference signal (CSI-RS) and a beacon reference signal. The BS 902 transmitting the UE specific beamformed CSI-RS at 918 and the NP CSI-RS at 910 in FIG. 9 is an example of transmitting a first beamformed channel state information reference signal (CSI-RS) and a beacon reference signal. Similarly, the BS 1102 transmitting the beacon reference signal at 1110 and the beamformed CSI-RS at 1112 in FIG. 11 is another example of transmitting a first CSI-RS and a beacon reference signal.

At 1302 the BS receives a beamformer adjustment indicator (BAI) that indicates information regarding adjustment of a forthcoming second beamformed CSI-RS. The BS 1102 receiving the BAI at 1114 in FIG. 11 is an example of receiving a BAI that indicates information regarding adjustment of a forthcoming second beamformed CSI-RS.

At 1303, the BS receives channel state information feedback (CSF). The BS 1102 receiving one or more of a CQI, PMI, and RI as shown at 1116 of FIG. 11, is an example of receiving channel state information feedback (CSF).

Operations 1300 conclude at 1304 with the BS transmitting the second beamformed CSI-RS, based on the information and the previously transmitted first beamformed. CSI-RS. The BS 1102 transmitting the adjusted beamformed CSI-RS at 1120 in FIG. 11 is an example of transmitting the second beamformed CSI-RS, based on the information and the previously transmitted first beamformed CSI-RS.

According to aspects of the present disclosure, configuration of a beacon RS (e.g., configuration of a LTE to detect beacon RSs) may include a number of antenna ports used for transmitting a configured beacon RS, time and frequency of the configured beacon RS, period of the configured beacon RS, subframe offset of the configured beacon RS, and/or a slot offset of the configured beacon reference signal. Thus, when the UE receives the beamformed CSI-RS, the UE knows the location (i.e., in time and frequency) the beamformed CST-RS and n how many and which ports the beamformed CSI-RS can be expected. Configuration of a beacon RS may further include an indication of associated beamformed CSI-RS(s) of the configured beacon RS. In some aspects of the present disclosure, the association (of beacon RS to beamformed. CSI-RS) may be predefined (e.g., in a network standard). In such case, explicit configuration and/or signaling of the association may not be performed.

According to aspects of the present disclosure, configuration of a beamformed CSI-RS may include a number of antenna ports used for transmitting a configured beamformed CST-RS, time and frequency of the configured beamformed CSI-RS, period of the configured beamformed subframe offset of the configured beamformed CSI-RS, and/or slot offset of the configured beamformed CSI-RS. Configuration of a beamformed CSI-RS may further include an indication of one or more associated beacon reference signals. In some aspects of the present disclosure, the association may be predefined. In such case, explicit configuration and/or signaling of the association may not be performed.

Figure 14A:
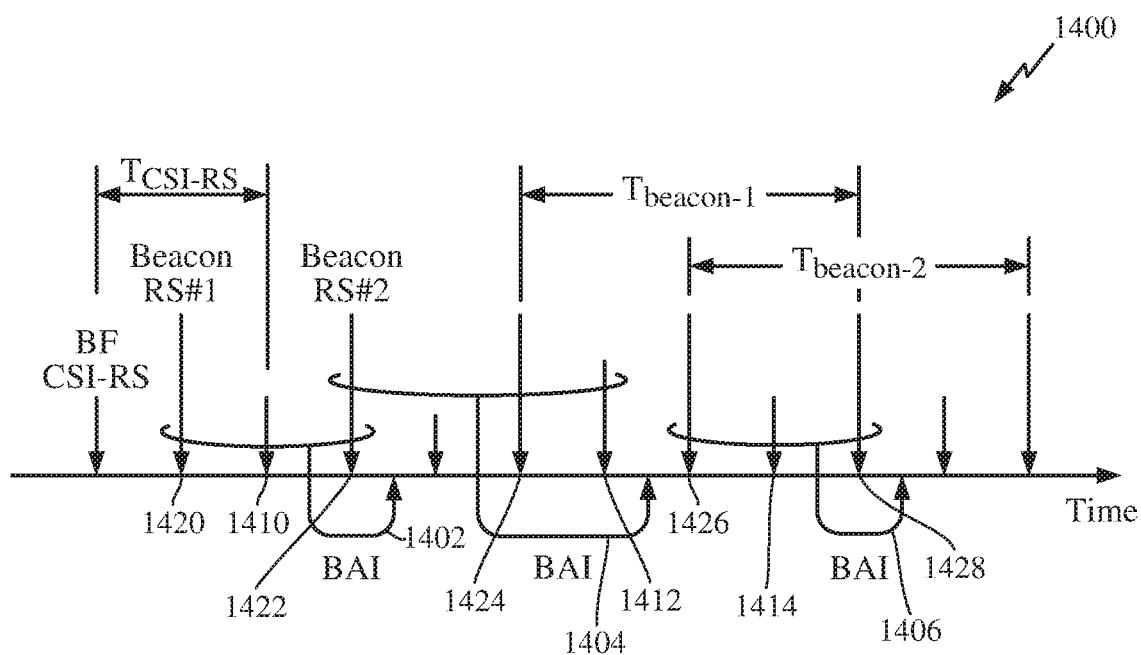
FIGS. 14A and 14B illustrate exemplary timelines of operations performed by devices operating in accordance with aspects of the present disclosure.
Figure 14B:
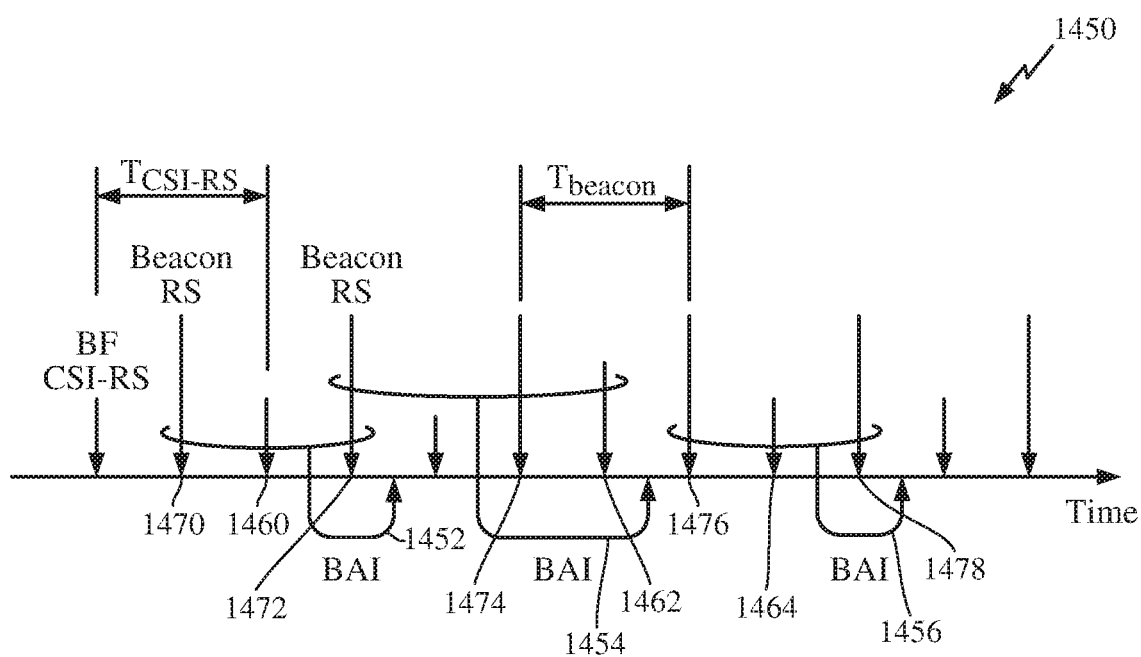

According to aspects of the present disclosure, a BAI transmitted by a UE may be based on one or more beacons. FIGS. 14A and 14B illustrate exemplary timelines 1400 and 1450 for a UE configured with more than one beacon or just one beacon respectively. FIG. 14A illustrates an exemplary timeline 1400 for a UE configured with more than one beacon (e.g., $K_{beacon}>1$). As illustrated, each BAI 1402, 1404, 1406 is derived based on a latest transmitted CSI-RS 1410, 1412, 1414 and associated beacon RS(s) 1420, 1422, 1424, 1426, 1428. According to aspects of the present disclosure, a BAI may be derived based on a subset of the associated beacon RS(s), with the subset indicated by L1 and/or RRC signaling. For example, the BAI 1404 may be associated with beacon reference signal #1 1424 and beacon reference signal #2 1422, but the UE may derive BAI 1404 based on beacon reference signal #1 1424 and not beacon reference signal #2 1422, if the UE receive signaling indicating that the UE should derive the BAI based on beacon reference signal #1 and not beacon reference signal #2.

FIG. 14B illustrates an exemplary timeline 1450 for a UE configured with one beacon (e.g., $K_{beacon}=1$). As illustrated, each BAI 1452, 1454, 1456 is derived based on a latest transmitted CSI-RS 1460, 1462, 1464 and a latest L instances of associated beacon RS(s) 1470, 1472, 1474, 1476, 1478, According to aspects of the present disclosure, the value of L may be predefined (e.g., in a network communications standard), or indicated by an eNB via RRC and/or L1 signaling.

According to aspects of the present disclosure, a UE can be configured to report BAIs periodically, semi-persistently, or aperiodically (see FIG. 12, step 1204). With periodic reporting, a reporting period and subframe offset may be determined by RRC configuration. The RRC configuration signaling may further include an indication of an associated beacon RS subset, for $K_{beacon}>1$, e.g., a bitmap of selected beacon RSs, and/or an indication of a value of L, for $K_{beacon}=1$.

According to aspects of the present disclosure, a UE can be configured report BAIs semi-persistently. A reporting period and subframe offset may be determined by RRC configuration L1 signaling. L1 signaling may be used to trigger activation and/or deactivation of the reporting of the BAIs. The RRC configuration and/or L1 signaling may further include an indication of an associated beacon RS subset, for $K_{beacon}>1$, e.g., a bitmap of selected beacon RSs, and/or an indication of a value of L, for $K_{beacon}=1$.

According to aspects of the present disclosure, a UE can be configured to report BAIs aperiodically. L1 signaling may be used to trigger an aperiodic report of a BM. The L1 signaling may further include an indication of an associated beacon RS subset, for $K_{beacon}>1$, e.g., a bitmap of selected beacon RSs, and/or an indication of a value of L, for $K_{beacon}=1$.

Figure 15:
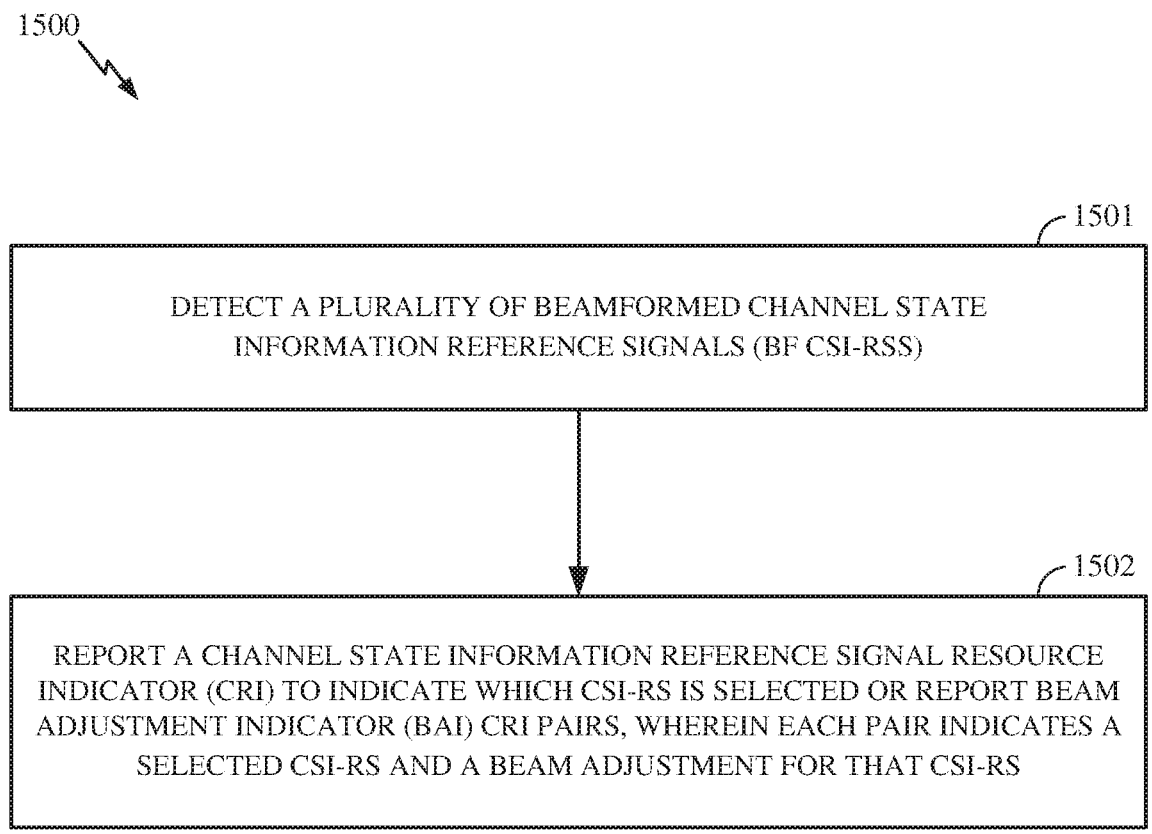
FIG. 15 illustrates exemplary operations by a UE to report CRI or BAI-CRI pairs.

FIG. 15 illustrates exemplary operations 1500 for wireless communications, in accordance with aspects of the present disclosure. Operations 1500 may be performed by a UE, such as UE 120 shown in FIG. 1, for example. Operations 1500 begin at 1501 with the UE detecting a plurality of beamformed channel state information reference signals (BE CSI-RSs). At 1502, the UE reports a channel state information reference signal resource indicator (CRI) to indicate which CSI-RS is selected or reports beamformer adjustment indicator (BM) CRI pairs, wherein each pair indicates a selected CSI-RS and a beam adjustment for that CSI-RS.

According to aspects of the present disclosure, a UE may be configured to detect a plurality of BF CSI-RSs (e.g., $K_{CSI}>1$). A UE configured to detect a plurality of BF CSI-RSs (see FIG. 15, step 1501) may be configured to report a CRI to indicate which one out of the $K_{CSI}$ CSI-RS is selected and a BAI for the CSI-RS indicated by the CRI (see FIG. 15, step 1502).

Additionally or alternatively, a UE configured to detect a plurality of BF CSI-RSs may be configured to report M BAI-CRI pairs (see FIG. 15, step 1501). Each pair would correspond to one out of M CSI-RS(s), where $M \leq K_{CSI}$. The value of M may be determined based on UE capability and/or category (e.g., cell phones may report more than PDAs). Additionally or alternatively the value of M may be configured via RRC and/or L1 signaling.

An exemplary operation for BAI derivation and CSI-RS precoder adjustment is as follows. A UE (e.g., UE 120 shown in FIG. 1) may be configured with one Q-port BF CSI-RS resource with beamformerT, $K_{beacon}$ Q-port beacon RS resources with beamformers $B_k$, where $k=1,2,\ldots,K_{beacon}$ and $K_{beacon}>1$, and a beacon RS subset $S \in \{1,2,\ldots,K_{beacon}\}$. An eNB may transmit one or more beacon RSs and a BF CSI-RS that the UE detects. The UE may estimate the BE CSI-RS channel, $H_T=HT$ and the kth beacon RS channel, $H_B^{(k)}=HB_k$, $k \in S$. The UE may compute matrix $R_B^{(k)}=E\{(H_T+\beta H_B^{(k)})^H(H_T+\beta H_B^{(k)})\}$, where $\beta$ is a scaling factor. The UE may then evaluate $\mu_k$, the benefit of adjusting T towards the kth beacon beamformer, e.g., $\mu_k=\text{tr}(R_B^{(k)})$, where tr denotes the trace operation. The UE may then report the BAI, e.g., $k^*=\text{argmax}_{k \in S} \mu_k$. The eNB may refine T based on the reported BAI, $T \leftarrow \text{Gram}(T+\alpha \cdot \Delta(T,k^*))$, where $\alpha$ is a scaling factor which may be transparent to the UE, $\Delta(\cdot)$ is a matrix function, e.g., $\Delta(T, k^*)=B_{k^*}-T$, and $\text{Gram}(\cdot)$ denotes the Gram-Schmidt orthogonalisation operation.

Another exemplary operation for BAI derivation and CSI-RS precoder adjustment is as follows. A UE (e.g., UE 120 shown in FIG. 1) may be configured with one Q-port BF CSI-RS resource with beamformer $T_k$ in subframe $kT_{CSRIS}+O_{CSIRS}$ and one Q-port beacon RS resource with beamformers $B_k$ in subframe $kT_{beacon}+O_{beacon}$. An eNB may transmit one or more beacon RSs and a BF CSI-RS that the UE detects. The UE may estimate the beacon RS channel, $H_B^{(k)}=H_{kT_{beacon}+O_{beacon}}B_k$, and its covariance, $R_B^{(k)}=E\{H_B^{(k)H}H_B^{(k)}\}$. The UE may then evaluate $\mu_k$, the benefit of adjusting T towards the kth beacon beamformer, e.g., $\mu_k=\text{tr}(R_B^{(k)})$. The UE may then report the BAI in subframe n, e.g., $$k^* = \text{argmax}_{k \in S\left(\lfloor \frac{n}{T_{beacon}} \rfloor, L\right)} \mu_k, \quad S(k_0, L) = \{k_0, k_0-1, \ldots, k_0-L+1\}.$$

The eNB may refine T based on the reported BAI, $T \leftarrow \text{Gram}(T+\alpha \cdot \Delta(T, k^*))$, where $\alpha$ is a scaling factor which may be transparent to UE, $\Delta(\cdot)$ is a matrix function, e.g., $\Delta(T, k^*)=B_{k^*}-T$, and $\text{Gram}(\cdot)$ denotes the Gram-Schmidt orthogonalisation operation.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. For example, means for receiving may include one or more of antennas 434, modulator/demodulator 432, MIMO detector 436, receive processor 438, antennas 452, modulator/demodulator 454. MIMO detector 456, and/or receive processor 458 shown in FIG. 4. Similarly, means for determining may include one or more of receive processor 438, controller/processor 440, memory 442, receive processor 458, controller/processor 480, and/or memory 482 shown in FIG. 4. Means for transmitting may include one or more of controller/processor 440, transmit processor 420, transmit MIMO processor 430, modulator/demodulators 432, antennas 434, controller/processor 480, transmit processor 464, transmit MIMO processor 466, modulator/demodulators 454, and/or antennas 452. Means for reporting may include one or more of controller/processor 440, memory 442, controller/processor 480, memory 482, transmit processor 420, transmit MIMO processor 430, modulator/demodulators 432, antennas 434, transmit processor 464, transmit MIMO processor 466, modulator/demodulators 454, and/or antennas 452. Means for obtaining may include one or more of antennas 434, modulator/demodulator 432, MIMO detector 436, receive processor 438, antennas 452, modulator/demodulator 454, MIMO detector 456, receive processor 458, controller/processor 440, memory 442, controller/processor 480, and/or memory 482 shown in FIG. 4. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files.

Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for determining a maximum available transmit power of the UE, instructions for semi-statically configuring a first minimum guaranteed power available for uplink transmission to a first base station and a second minimum guaranteed power available for uplink transmission to a second base station, and instructions for dynamically determining a first maximum transmit power available for uplink transmission to the first base station and a second maximum transmit power available for uplink transmission to the second base station based, at least in part, on the maximum available transmit power of the UE, the first minimum guaranteed power, and the second minimum guaranteed power.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications performed by a user equipment (UE), comprising:
   obtaining a configuration of a beacon reference signal, wherein the configuration comprises at least one of: antenna ports used for transmitting the beacon reference signal, a frequency used for transmitting the beacon reference signal, a time for transmitting the beacon reference signal, a period for transmitting the beacon reference signal, a subframe offset for transmitting the beacon reference signal, or a slot offset for transmitting the beacon reference signal;
   obtaining an indication of an association between a first beamformed channel state information reference signal (CSI-RS) and the beacon reference signal;
   receiving the first beamformed CSI-RS and the beacon reference signal;
   determining, based on the first beamformed CSI-RS and the beacon reference signal, information regarding an adjustment, preferred by the UE, of a beamformer to be used for a forthcoming second beamformed CSI-RS, wherein the information comprises an amount of benefit of adjusting the first beamformed CSI-RS toward the beacon reference signal;
   transmitting a beamformer adjustment indicator (BAI), periodically, semi-persistently, or aperiodically, that indicates the preferred adjustment; and
   reporting channel state information feedback (CSF), based on the first beamformed CSI-RS.

2. The method of claim 1, wherein the information is determined based on a plurality of beacon reference signals, and the method further comprises:
   obtaining an indication of a number of beacon reference signals to use in determining the information.

3. A method for wireless communications performed by a user equipment (UE), comprising:
   obtaining a configuration of a beacon reference signal, wherein the configuration comprises at least one of: antenna ports used for transmitting the beacon reference signal, a frequency used for transmitting the beacon reference signal, a time for transmitting the beacon reference signal, a period for transmitting the beacon reference signal, a subframe offset for transmitting the beacon reference signal, or a slot offset for transmitting the beacon reference signal;

obtaining an indication of an association between a first beamformed channel state information reference signal (CSI-RS) and the beacon reference signal;

receiving the first beamformed CSI-RS and the beacon reference signal;

determining, based on the first beamformed CSI-RS and the beacon reference signal, information regarding an adjustment, preferred by the UE, of a beamformer to be used for a forthcoming second beamformed CSI-RS;

transmitting a beamformer adjustment indicator (BAI), periodically, semi-persistently, or aperiodically, that indicates the UE-preferred adjustment and which first beamformed CSI-RS, of a plurality of first beamformed CSI-RSs, the BAI is based on; and reporting channel state information feedback (CSF), based on the first beamformed CSI-RS.

4. A method for wireless communications, comprising:

transmitting a configuration of a beacon reference signal, wherein the configuration comprises at least one of: antenna ports used for transmitting the beacon reference signal, a frequency used for transmitting the beacon reference signal, a time for transmitting the beacon reference signal, a period for transmitting the beacon reference signal, a subframe offset for transmitting the beacon reference signal, or a slot offset for transmitting the beacon reference signal;

transmitting an indication of an association between a first beamformed channel state information reference signal (CSI-RS) and the beacon reference signal;

transmitting the first beamformed CSI-RS and the beacon reference signal;

receiving a beamformer adjustment indicator (BAI) that indicates information regarding adjustment of a forthcoming second beamformed CSI-RS, wherein the information comprises an amount of benefit of adjusting the first beamformed CSI-RS toward the beacon reference signal;

receiving channel state information feedback (CSF); and transmitting the second beamformed CSI-RS, based on the information and the previously transmitted first beamformed CSI-RS.

5. The method of claim 4, further comprising:

transmitting a trigger, wherein the BAI is transmitted in response to the trigger.

6. The method of claim 4, wherein the information is determined based on a plurality of beacon reference signals, and the method further comprises:

transmitting an indication of a number of beacon reference signals to use in determining the information.

7. The method of claim 4, wherein the BAI indicates information for adjusting a plurality of forthcoming second beamformed CSI-RSs.

8. A method for wireless communications, comprising:

transmitting a configuration of a beacon reference signal, wherein the configuration comprises at least one of: antenna ports used for transmitting the beacon reference signal, a frequency used for transmitting the beacon reference signal, a time for transmitting the beacon reference signal, a period for transmitting the beacon reference signal, a subframe offset for transmitting the beacon reference signal, or a slot offset for transmitting the beacon reference signal;

transmitting an indication of an association between a first beamformed channel state information reference signal (CSI-RS) and the beacon reference signal;

transmitting the first beamformed CSI-RS and the beacon reference signal;

receiving a beamformer adjustment indicator (BAI) that indicates information regarding adjustment of a forthcoming second beamformed CSI-RS and which first beamformed CSI-RS, of a plurality of first beamformed CSI-RSs, the BAI is based on;

receiving channel state information feedback (CSF); and transmitting the second beamformed CSI-RS, based on the information and the previously transmitted first beamformed CSI-RS.

9. An apparatus for wireless communications performed, comprising:

means for obtaining a configuration of a beacon reference signal, wherein the configuration comprises at least one of: antenna ports used for transmitting the beacon reference signal, a frequency used for transmitting the beacon reference signal, a time for transmitting the beacon reference signal, a period for transmitting the beacon reference signal, a subframe offset for transmitting the beacon reference signal, or a slot offset for transmitting the beacon reference signal;

means for obtaining an indication of an association between a first beamformed channel state information reference signal (CSI-RS) and the beacon reference signal;

means for receiving the first beamformed CSI-RS and the beacon reference signal;

means for determining, based on the first beamformed CSI-RS and the beacon reference signal, information regarding an adjustment, preferred by the apparatus, of a beamformer to be used for a forthcoming second beamformed CSI-RS, wherein the information comprises an amount of benefit of adjusting the first beamformed CSI-RS toward the beacon reference signal;

means for transmitting a beamformer adjustment indicator (BAI), periodically, semi-persistently, or aperiodically, that indicates the preferred adjustment; and means for reporting channel state information feedback (CSF), based on the first beamformed CSI-RS.

10. The apparatus of claim 9, wherein the means for determining the information comprises means for determining the information based on a plurality of beacon reference signals, and the apparatus further comprises:

means for obtaining an indication of a number of beacon reference signals to use in determining the information.

11. An apparatus for wireless communications performed, comprising:

means for obtaining a configuration of a beacon reference signal, wherein the configuration comprises at least one of: antenna ports used for transmitting the beacon reference signal, a frequency used for transmitting the beacon reference signal, a time for transmitting the beacon reference signal, a period for transmitting the beacon reference signal, a subframe offset for transmitting the beacon reference signal, or a slot offset for transmitting the beacon reference signal;

means for obtaining an indication of an association between a first beamformed channel state information reference signal (CSI-RS) and the beacon reference signal;

means for receiving the first beamformed CSI-RS and the beacon reference signal;

means for determining, based on the first beamformed CSI-RS and the beacon reference signal, information regarding an adjustment, preferred by the apparatus, of a beamformer to be used for a forthcoming second beamformed CSI-RS;
means for transmitting a beamformer adjustment indicator (BAI), periodically, semi-persistently, or aperiodically, that indicates the preferred adjustment and which first beamformed CSI-RS, of a plurality of first beamformed CSI-RSs, the BAI is based on; and
means for reporting channel state information feedback (CSF), based on the first beamformed CSI-RS.

12. An apparatus for wireless communications, comprising:
means for transmitting a configuration of a beacon reference signal, wherein the configuration comprises at least one of: antenna ports used for transmitting the beacon reference signal, a frequency used for transmitting the beacon reference signal, a time for transmitting the beacon reference signal, a period for transmitting the beacon reference signal, a subframe offset for transmitting the beacon reference signal, or a slot offset for transmitting the beacon reference signal;
means for transmitting an indication of an association between a first beamformed channel state information reference signal (CSI-RS) and the beacon reference signal;
means for transmitting the first beamformed CSI-RS and the beacon reference signal;
means for receiving a beamformer adjustment indicator (BAI) that indicates information regarding adjustment of a forthcoming second beamformed CSI-RS, wherein the information comprises an amount of benefit of adjusting the first beamformed CSI-RS toward the beacon reference signal;
means for receiving channel state information feedback (CSF); and
means for transmitting the second beamformed CSI-RS, based on the information and the previously transmitted first beamformed CSI-RS.

13. The apparatus of claim 12, further comprising:
means for transmitting a trigger, wherein the BAI is transmitted in response to the trigger.

14. The apparatus of claim 12, wherein the information is determined based on a plurality of beacon reference signals, and the method further comprises:
means for transmitting an indication of a number of beacon reference signals to use in determining the information.

15. The apparatus of claim 12, wherein the BAI indicates information for adjusting a plurality of second forthcoming beamformed CSI-RSs.

16. An apparatus for wireless communications, comprising:
means for transmitting a configuration of a beacon reference signal, wherein the configuration comprises at least one of: antenna ports used for transmitting the beacon reference signal, a frequency used for transmitting the beacon reference signal, a time for transmitting the beacon reference signal, a period for transmitting the beacon reference signal, a subframe offset for transmitting the beacon reference signal, or a slot offset for transmitting the beacon reference signal;
means for transmitting an indication of an association between a first beamformed channel state information reference signal (CSI-RS) and the beacon reference signal;
means for transmitting the first beamformed CSI-RS and the beacon reference signal;
means for receiving a beamformer adjustment indicator (BAI) that indicates information regarding adjustment of a forthcoming second beamformed CSI-RS and which first beamformed CSI-RS, of a plurality of first beamformed CSI-RSs, the BAI is based on;
means for receiving channel state information feedback (CSF); and
means for transmitting the second beamformed CSI-RS, based on the information and the previously transmitted first beamformed CSI-RS.

* * * * *